(12) United States Patent
Patel et al.

(10) Patent No.: US 8,958,348 B2
(45) Date of Patent: *Feb. 17, 2015

(54) HYBRID PUSH-TO-TALK FOR MOBILE PHONE NETWORKS

(75) Inventors: Krishnakant M. Patel, Richardson, TX (US); Ravi Ayyasamy, Richardson, TX (US); Gorachand Kundu, Bangalore (IN); Basem A. Ardah, Plano, TX (US); Anand Narayanan, Plano, TX (US); Brahmananda R. Vempati, Dallas, TX (US); Pratap Chandana, Plano, TX (US)

(73) Assignee: Kodiak Networks, Inc., San Ramon, CA (US)

(*) Notice: Subject to any disclaimer, the term of this patent is extended or adjusted under 35 U.S.C. 154(b) by 303 days.

This patent is subject to a terminal disclaimer.

(21) Appl. No.: 12/582,601

(22) Filed: Oct. 20, 2009

(65) Prior Publication Data

US 2010/0142414 A1 Jun. 10, 2010

Related U.S. Application Data

(60) Provisional application No. 61/106,689, filed on Oct. 20, 2008.

(51) Int. Cl.
*H04B 7/005* (2006.01)
*H04W 4/10* (2009.01)
(Continued)

(52) U.S. Cl.
CPC .............. *H04W 4/10* (2013.01); *H04W 76/005* (2013.01); *H04W 76/02* (2013.01); *H04W 88/14* (2013.01)
USPC ........... 370/277; 370/259; 370/278; 370/329; 370/411; 370/466; 455/518; 455/519

(58) Field of Classification Search
None
See application file for complete search history.

(56) References Cited

U.S. PATENT DOCUMENTS 3,912,874 A  10/1975 Botterell et al.
4,796,293 A  1/1989 Blinken et al.
(Continued)

FOREIGN PATENT DOCUMENTS

JP  2003-092776  3/2003
JP  2003-92776  3/2003
(Continued)

OTHER PUBLICATIONS

International Search Report mailed Dec. 18, 2009, International application No. PCT/US2009/061369, International filing date Oct. 20, 2009.

(Continued)

*Primary Examiner* — David Oveissi
(74) *Attorney, Agent, or Firm* — Gates & Cooper LLP

(57) ABSTRACT

A Hybrid Push-to-Talk (PTT) function for use in wireless communications networks, such as cellular mobile telephone networks. The cellular mobile telephone network includes a Real-Time Exchange (RTX) that interfaces to at least one Mobile Switching Center (MSC) in the cellular mobile telephone network to provide instant two-way half-duplex voice messaging within a group of users. In the Hybrid PTT function, first or initial talkbursts or volleys are transmitted by the RTX from an originating mobile to terminating mobiles on pre-established Internet Protocol (IP) sessions between the RTX and the mobiles. In addition, circuit channels are established by the RTX with the mobiles through the MSC in parallel with the first talkburst or volley. Thereafter, second or subsequent talkbursts or volleys are transmitted by the RTX from the originating mobile to the terminating mobiles on the circuit channels.

26 Claims, 14 Drawing Sheets

(51) Int. Cl.
*H04W 76/00* (2009.01)
*H04W 76/02* (2009.01)
*H04W 88/14* (2009.01)

(56) References Cited

U.S. PATENT DOCUMENTS

| | | | |
|---|---|---|---|
| 5,353,328 | A | 10/1994 | Jokimies |
| 5,442,809 | A | 8/1995 | Diaz et al. |
| 5,546,449 | A | 8/1996 | Hogan et al. |
| 5,711,011 | A | 1/1998 | Urs et al. |
| 5,752,196 | A | 5/1998 | Ahvenainen et al. |
| 5,987,318 | A | 11/1999 | Alperovich et al. |
| 6,011,976 | A | 1/2000 | Michaels et al. |
| 6,021,326 | A | 2/2000 | Nguyen |
| 6,138,011 | A | 10/2000 | Sanders, III et al. |
| 6,192,119 | B1 | 2/2001 | Wilson |
| 6,304,558 | B1 | 10/2001 | Mysore |
| 6,397,054 | B1 | 5/2002 | Hoirup et al. |
| 6,405,030 | B1 | 6/2002 | Suprunov |
| 6,411,815 | B1 | 6/2002 | Balasuriya |
| 6,477,366 | B1 | 11/2002 | Valentine et al. |
| 6,477,387 | B1 | 11/2002 | Jackson et al. |
| 6,549,773 | B1 | 4/2003 | Linden et al. |
| 6,577,874 | B1 | 6/2003 | Dailey |
| 6,606,305 | B1 | 8/2003 | Boyle et al. |
| 6,628,937 | B1 | 9/2003 | Salin |
| 6,661,878 | B1 | 12/2003 | Mirashrafi et al. |
| 6,725,053 | B2 * | 4/2004 | Rosen et al. .................. 455/518 |
| 6,751,468 | B1 | 6/2004 | Heubel et al. |
| 6,801,762 | B1 | 10/2004 | Huilgol |
| 6,856,676 | B1 | 2/2005 | Pirot et al. |
| 6,865,398 | B2 | 3/2005 | Mangal et al. |
| 6,892,074 | B2 | 5/2005 | Tarkiainen et al. |
| 6,895,254 | B2 | 5/2005 | Dorenbosch |
| 6,898,436 | B2 | 5/2005 | Crockett et al. |
| 6,996,414 | B2 | 2/2006 | Vishwanathan et al. |
| 7,026,926 | B1 | 4/2006 | Walker, III |
| 7,043,266 | B2 | 5/2006 | Chaturvedi et al. |
| 7,085,364 | B1 | 8/2006 | Ahmed et al. |
| 7,099,291 | B2 | 8/2006 | Harris et al. |
| 7,123,905 | B1 | 10/2006 | Allaway et al. |
| 7,170,863 | B1 | 1/2007 | Denman et al. |
| 7,231,225 | B2 | 6/2007 | Rao et al. |
| 7,236,580 | B1 | 6/2007 | Sarkar et al. |
| 7,366,535 | B2 | 4/2008 | Glass et al. |
| 7,403,775 | B2 | 7/2008 | Patel et al. |
| 7,529,557 | B2 | 5/2009 | Farrill |
| 7,797,010 | B1 | 9/2010 | Manroa et al. |
| 2001/0005372 | A1 | 6/2001 | Cave et al. |
| 2002/0024943 | A1 | 2/2002 | Karaul et al. |
| 2002/0077136 | A1 | 6/2002 | Maggenti et al. |
| 2002/0086659 | A1 | 7/2002 | Lauper |
| 2002/0196781 | A1 | 12/2002 | Salovuori |
| 2003/0009463 | A1 | 1/2003 | Gallant |
| 2003/0016632 | A1 | 1/2003 | Refai et al. |
| 2003/0017836 | A1 | 1/2003 | Vishwanathan et al. |
| 2003/0078064 | A1 | 4/2003 | Chan |
| 2003/0148779 | A1 | 8/2003 | Aravamudan et al. |
| 2003/0153343 | A1 | 8/2003 | Crockett et al. |
| 2003/0190888 | A1 | 10/2003 | Mangal et al. |
| 2004/0032843 | A1 | 2/2004 | Schaefer et al. |
| 2004/0057449 | A1 | 3/2004 | Black |
| 2004/0067751 | A1 | 4/2004 | Vandermeijden et al. |
| 2004/0095954 | A1 | 5/2004 | Varney et al. |
| 2004/0152441 | A1 | 8/2004 | Wong |
| 2004/0179531 | A1 | 9/2004 | Bi et al. |
| 2004/0196826 | A1 | 10/2004 | Bao et al. |
| 2004/0203793 | A1 | 10/2004 | Dorenbosch |
| 2004/0219941 | A1 | 11/2004 | Haaramo et al. |
| 2004/0224710 | A1 | 11/2004 | Koskelainen et al. |
| 2004/0228292 | A1 | 11/2004 | Edwards |
| 2004/0259580 | A1 | 12/2004 | Florkey et al. |
| 2005/0047362 | A1 | 3/2005 | Harris et al. |
| 2005/0101308 | A1 | 5/2005 | Lee |
| 2005/0111430 | A1 | 5/2005 | Spear et al. |
| 2005/0143135 | A1 | 6/2005 | Brems et al. |
| 2005/0164737 | A1 | 7/2005 | Brown |
| 2005/0189337 | A1 | 9/2005 | Baune |
| 2005/0192041 | A1 | 9/2005 | Oxley et al. |
| 2005/0202807 | A1 | 9/2005 | Ayyasamy et al. |
| 2005/0221819 | A1 * | 10/2005 | Patel et al. .................. 455/432.1 |
| 2005/0232241 | A1 | 10/2005 | Wu et al. |
| 2005/0239485 | A1 | 10/2005 | Kundu et al. |
| 2005/0254464 | A1 | 11/2005 | Patel et al. |
| 2005/0261016 | A1 | 11/2005 | Patel et al. |
| 2006/0003751 | A1 | 1/2006 | Vo |
| 2006/0019654 | A1 | 1/2006 | Farrill |
| 2006/0029189 | A1 | 2/2006 | Patel et al. |
| 2006/0030347 | A1 | 2/2006 | Biswas |
| 2006/0056361 | A1 | 3/2006 | Jiang et al. |
| 2006/0067499 | A1 | 3/2006 | Oliveira et al. |
| 2006/0078064 | A1 | 4/2006 | Schmidt et al. |
| 2006/0094455 | A1 | 5/2006 | Hannu et al. |
| 2006/0116150 | A1 | 6/2006 | Bhutiani |
| 2006/0189337 | A1 | 8/2006 | Farrill et al. |
| 2006/0198334 | A1 | 9/2006 | Civanlar et al. |
| 2006/0229090 | A1 * | 10/2006 | LaDue .......................... 455/507 |
| 2006/0234687 | A1 | 10/2006 | Patel et al. |
| 2007/0037597 | A1 | 2/2007 | Biswas et al. |
| 2007/0037598 | A1 | 2/2007 | Ayyasamy et al. |
| 2007/0190984 | A1 * | 8/2007 | Ayyasamy et al. ......... 455/414.1 |
| 2007/0197234 | A1 * | 8/2007 | Gill et al. .................... 455/458 |
| 2007/0253347 | A1 | 11/2007 | Patel et al. |
| 2008/0064364 | A1 | 3/2008 | Patel et al. |
| 2009/0092116 | A1 | 4/2009 | Jiang et al. |
| 2009/0149167 | A1 | 6/2009 | Patel et al. |
| 2009/0209235 | A1 | 8/2009 | Lawler et al. |

FOREIGN PATENT DOCUMENTS

| | | |
|---|---|---|
| WO | 00/79825 | 12/2000 |
| WO | 02/101981 | 12/2002 |
| WO | 03/101007 | 12/2003 |
| WO | 2005/009006 | 1/2005 |
| WO | 2005/112494 | 11/2005 |
| WO | 2005/115032 | 12/2005 |
| WO | 2005/117474 | 12/2005 |
| WO | 2006/105287 | 10/2006 |

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.
Nokia: "What is TETRA? Why Nokia TETRA?", The Nokia TETRA Primer, 2002, pp. 1-29. XP002345778 http://www.nokia.com/downloads/solutions/government/SD114EN_gov.pdf.
SKYPE: "Skype". Web Archive—SKYPE, May 22, 2004, pp. 1-2. XP002345780 http://web.archive.org/web/20040522201727 http://www.skype.com.
Trachwell: "TrackWell Software and Tetra Iceland deliver value added services to Tetra users", Trackwell.com, Oct. 2002, pp. 1-1. XP002345781 http://www.trackwell.com/news/news_twandtetra.htm.

* cited by examiner

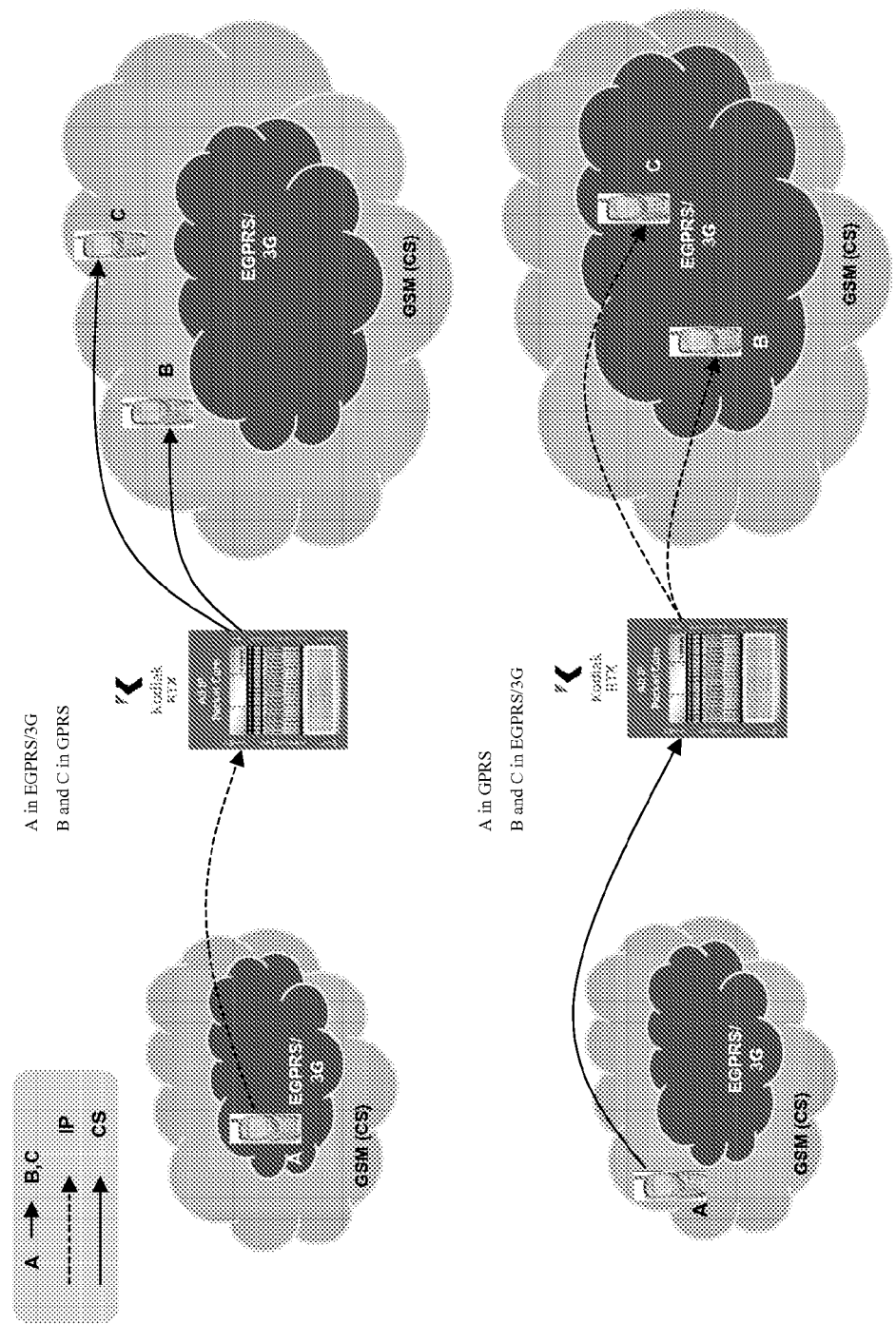

HYBRID PUSH-TO-TALK FOR MOBILE PHONE NETWORKS

CROSS REFERENCE TO RELATED APPLICATIONS

This application claims the benefit under 35 U.S.C. Section 119(e) of the following commonly-assigned patent application:

U.S. Provisional Application Ser. No. 61/106,689, filed on Oct. 20, 2008, by Krishnakant M. Patel, Ravi Ayyasamy, Gorachand Kundu, Basem A. Ardah, Anand Narayanan, and Brahmananda R. Vempati, entitled "HYBRID PUSH-TO-TALK,"

which application is incorporated by reference herein.

This application is related to the following commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," now U.S. Pat. No. 7,787,896, issued Aug. 31, 2010, which application claims the benefit under 35 U.S.C. Section 365 of P.C.T. International Application Serial Number PCT/US03/16386, which application claims the benefit under 35 U.S.C. Section 119(e) of U.S. Provisional Application Ser. Nos. 60/382,981, 60/383,179 and 60/407,168;

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of P.C.T. International Application Serial Number PCT/US04/23038, which application claims the benefit under 35 U.S.C. Section 119(e) of U.S. Provisional Application Ser. Nos. 60/488,638, 60/492,650 and 60/576,094 and which application is a continuation-in-part and claims the benefit under 35 U.S.C. Sections 119, 120 and/or 365 of P.C.T. International Application Serial Number PCT/US03/16386;

U.S. patent application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," now U.S. Pat. No. 7,738,892, issued Jun. 15, 2010, which application claims the benefit under 35 U.S.C. Section 119(e) of U.S. Provisional Application Ser. Nos. 60/569,953 and 60/579,309, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," now U.S. Pat. No. 7,403,775, issued Jul. 22, 2008, which application claims the benefit under 35 U.S.C. Section 119(e) of U.S. Provisional Application Ser. No. 60/571,075, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," now U.S. Pat. No. 7,764,950, issued Jul. 27, 2010, which application claims the benefit under 35 U.S.C. Section 119(e) of U.S. Provisional Application Ser. Nos. 60/573,059 and 60/576,092, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/129,268;

U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS," now U.S. Pat. No. 7,738,896, issued Jun. 15, 2010, which application claims the benefit under 35 U.S.C. Section 119(e) of U.S. Provisional Application Ser. No. 60/573,780, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/134,883;

U.S. Utility application Ser. No. 11/158,527, filed Jun. 22, 2005, by F. Craig Farrill, entitled "PRESS-TO-CONNECT FOR WIRELESS COMMUNICATIONS SYSTEMS," now U.S. Pat. No. 7,529,557, issued May 5, 2009, which application claims the benefit under 35 U.S.C. Section 119(e) of U.S. Provisional Application Ser. No. 60/581,954, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," now U.S. Pat. No. 7,813,722, issued Oct. 12, 2010, which application claims the benefit under 35 U.S.C. Section 119(e) of U.S. Provisional Application Ser. No. 60/654,271;

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/654,271;

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Application Ser. No. 60/666,424;

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS," now U.S. Pat. No. 7,689,238, issued Mar. 30, 2010, which application claims the benefit under 35 U.S.C. Section 119(e) of U.S. Provisional Application Ser. No. 60/705,115;

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM," now U.S. Pat. No. 8,036,692, issued Oct. 11, 2011, which application claims the benefit under 35 U.S.C. Section 119(e) of U.S. Provisional Application Ser. No. 60/706,265;

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/742,250;

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM," now U.S. Pat. No. 7,853,279, issued Dec. 14, 2010, which application claims the benefit under 35 U.S.C. Section 119(e) of U.S. Provisional Application Ser. No. 60/795,090;

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS," which application claims the benefit under 35 U.S.C. Section 119(e) of U.S. Provisional Application Ser. No. 60/836,521;

U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. Nos. 60/982,650 and 61/023,042;

U.S. Utility application Ser. No. 12/359,861, filed on Jan. 26, 2009, by Bruce D. Lawler, Krishnakant M. Patel, Ravi Ayyasamy, Harisha Mahabaleshwara Negaluguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION," which application claims the benefit under 35 U.S.C. Section 119(e) of U.S. Provisional Application Ser. No. 61/023,332;

all of which applications are incorporated by reference herein.

BACKGROUND OF THE INVENTION

1. Field of the Invention

This invention relates in general to mobile phone networks, and more specifically, to a Hybrid Push-to-Talk (PTT) function in a mobile phone network.

2. Description of Related Art

Advanced voice services (AVS), also known as Advanced Group Services (AGS), such as two-way half-duplex voice calls within a group, also known as Push-to-Talk (PTT) or Press-to-Talk (P2T), as well as other AVS functions, such as Push-to-Conference (P2C) or Instant Conferencing, Push-to-Message (P2M), etc., are described in the commonly-assigned patent applications cross-referenced above and incorporated by reference herein. These AVS functions have enormous revenue earnings potential for wireless communications systems, such as cellular networks and personal communications systems (PCS) networks.

Currently, there are three major approaches employed in providing advanced voice services in wireless communications systems. One approach requires the installation of a dedicated private network, parallel to the wireless communications system, to support the group-based voice services. NEXTEL uses such a system, based on a solution developed by MOTOROLA known as IDEN. However, a dedicated private network is costly to install and maintain and is employed by a few public wireless carriers. Also, the IDEN system is non-standard, and hence cannot be used in standard wireless communications networks, such as those based on GSM (Global System for Mobile Communications) and CDMA (Code Division Multiple Access).

Another approach is based on Voice over IP (VoIP) technologies. While this approach promises compliance with newer and emerging standards, such as GPRS (General Packet Radio Service), UMTS (Universal Mobile Telecommunications System), etc., it does not provide a solution for carriers employing wireless communications systems based on existing standards, such as GSM, CDMA, etc. However, even for the newer standards, solutions based on VoIP have serious drawbacks, including slower call setup, significant overhead, increased susceptibility to packet losses, low bit rate voice coders, and poor voice quality due to lack of Quality of Service (QoS) guarantees. Further, carrier deployment of networks capable of supporting the stringent demands of VoIP is spotty and far from ubiquitous. There is a need, instead, for solutions that require only minimal upgrades to the handset.

Still another approach is that defined in the commonly-assigned patent applications cross-referenced above and incorporated by reference herein. In this approach, advanced voice services are provided by a dispatch gateway (DG) or real-time exchange (RTX) that interfaces to the wireless communications system to provide the advanced voice services therein, wherein both the dispatch gateway and mobiles that use the advanced voice services communicate with each other using call setup and in-band signaling within the wireless communications system. This approach based on circuit switching solution provides the same voice quality as the underlying cellular network and hence has superior voice quality performance compared to solutions based on VoIP. However, in this approach the initial call setup time is dependent on the underlying cellular voice network.

Notwithstanding these innovations, there is a need in the art for improvements to the methods and systems for delivering the advanced voice services that comply with existing and emerging wireless standards and yet provide superior user experiences by utilizing the circuit switched solution for superior voice quality and an optimized call setup method for an overall superior user experience. The present invention satisfies this need.

SUMMARY OF THE INVENTION

To overcome the limitations in the prior art described above, and to overcome other limitations that will become apparent upon reading and understanding the present specification, the present invention discloses a Hybrid Push-to- Talk (PTT) function for use in wireless communications networks, such as cellular mobile phone networks.

The cellular telephone network is normally used for making calls between mobiles, wherein the calls are initiated by call setup and in-band signaling within the cellular telephone network and voice frames for the calls are switched between the mobiles by at least one mobile switching center across bearer paths in the cellular telephone network.

In the present invention, the cellular telephone network also includes at least one real-time exchange (RTX) that interfaces to at least one mobile switching center (MSC) in the cellular telephone network to provide advanced voice services therein, wherein the advanced voice services provide instant two-way half-duplex voice messaging within a group of users of the cellular telephone network, which is known as a Hybrid PTT call.

In the Hybrid PTT call, a first talkburst or volley is transmitted by the RTX from an originating mobile to one or more terminating mobiles on one or more pre-established Internet Protocol (IP) sessions between the RTX and the mobiles. In addition, one or more circuit (switched) channels are established by the RTX with the mobiles through the MSC in parallel with the first talkburst or volley. Thereafter, second and subsequent talkbursts or volleys are transmitted by the RTX from the originating mobile to the terminating mobiles on the circuit channels.

In one embodiment, a "Group Home" RTX acts as a controller of the Hybrid PTT call. Each of the mobiles pre-establishes the IP sessions with its own "Home" RTX, the Home TX establishes one or more IP sessions with the Group Home RTX, and the Hybrid PTT call is routed through the Home RTX to the Group Home RTX. A mobile that is outside the cellular telephone network pre-establishes the IP sessions with its own Home RTX via a Roaming Gateway.

BRIEF DESCRIPTION OF THE DRAWINGS

Referring now to the drawings in which like reference numbers represent corresponding parts throughout:

FIGS. 9A, 9B, 9C and 9D are illustrations of initial volley delivery for the Hybrid Push-to-Talk call according to one embodiment of the present invention.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention describes a Hybrid Push-to-Talk call for wireless networks, such as cellular mobile phone networks.

Network Architecture

Figure 1:
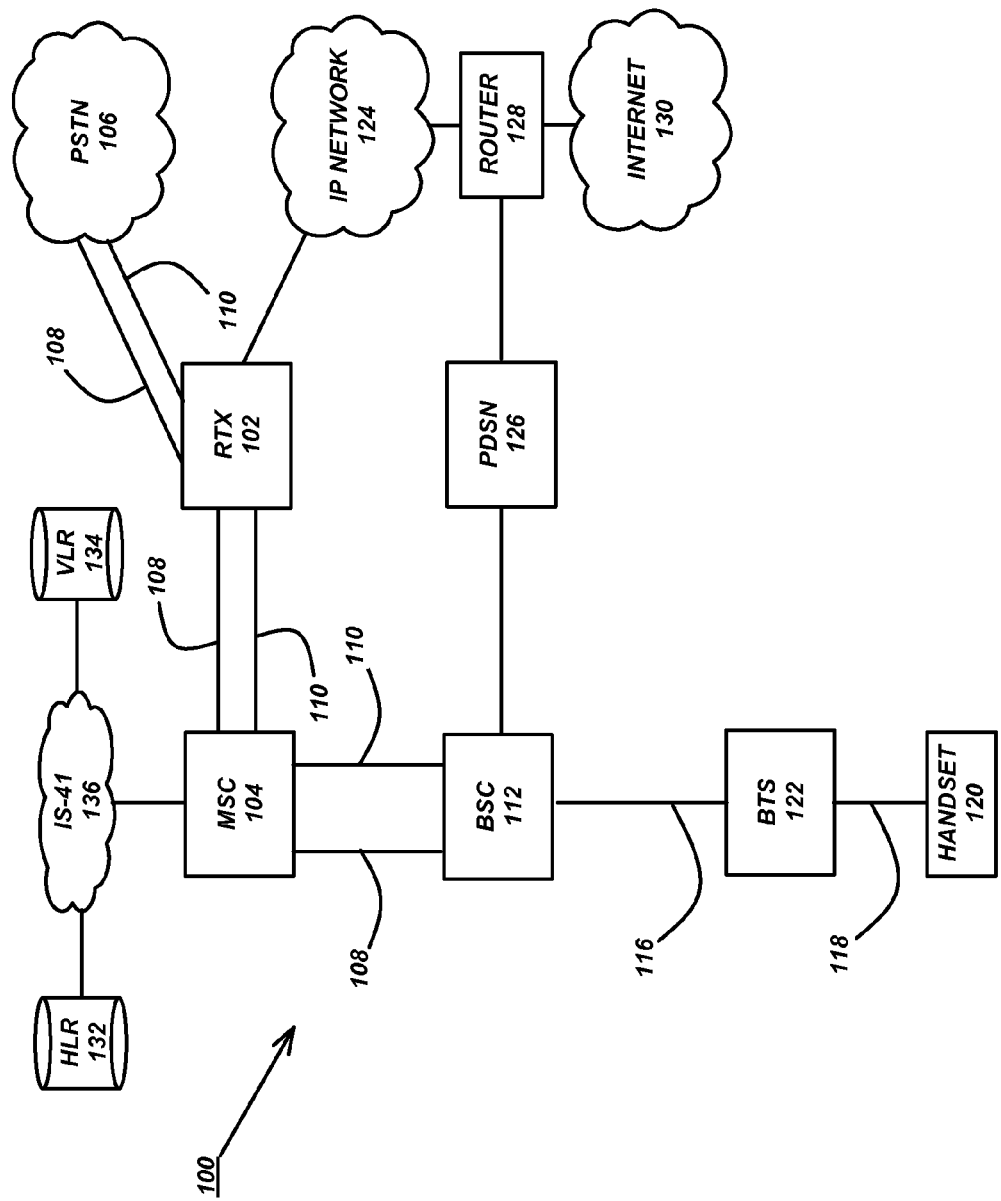
FIG. 1 is a block diagram that illustrates an exemplary embodiment of a wireless communications network according to a preferred embodiment of the present invention.

FIG. 1 is a block diagram that illustrates an exemplary embodiment of a wireless communications network (also known as a cellular phone network or mobile phone network or simply a mobile communications network) according to a preferred embodiment of the present invention.

Within the network 100, an RTX (Real-Time Exchange) 102, previously known as a Dispatch Gateway (DG), communicates with a MSC (Mobile Switching Center) 104 and PSTN (Public Switched Telephone Network) 106 using SS7—ISUP/WIN/CAMEL (Signaling System 7—Integrated Services Digital Network User Part/Wireless Intelligent Network/Customized Applications for Mobile Enhanced Logic) messages at a signaling plane 108. A bearer path 110 implements a TDM (Time Division Multiplexing) interface carrying PCM (Pulse Code Modulation) or TFO (Tandem Free Operation) voice frames. Support for TFO in this path 110 is negotiated between a BSC (Base Station Controller) 112 and the RTX 102 for each originating and terminating leg of an AVS call. The use of TFO ensures high voice quality (as voice vocoder conversion is avoided) between mobile-to-mobile calls.

When a subscriber originates an AVS call, the MSC 104 routes the call to the RTX 102. The MSC 104 also requests the BSC 112 via 116 to establish a radio traffic path 118 with a mobile 120 (also known simply as a mobile station, mobile unit, mobile phone, cellular phone or handset) via the BTS (Base Transceiver Station) 122 (as it does for a normal cellular call). At this time, the BSC 112 tries to negotiate TFO (if it is supported) on a TDM link with the far end (in this case, the RTX 102).

At the same time (after the MSC 104 terminates the group call request to the RTX 102), the RTX 102 identifies the terminating group users and their numbers, which may comprise an MS-ISDN (Mobile Station—Integrated Services Digital Network) number, an IMSI (International Mobile Subscriber Identity) number, or an MDN (Mobile Directory Number).

The RTX 102 sends an ISUP call origination request for each terminating mobile 120. It may send requests directly to the MSC 104, PSTN 106 or IP network 124 via a PDSN (Public Data Switched Network) 126, Router 128, and/or Internet/Intranet 130, depending on the routing table configuration for terminating numbers. Once the bearer path 110 is established, the RTX 102 begins a negotiation with the far end (in this case, the terminating BSC 112) for each terminating leg to a mobile 120.

Once bearer paths 110 are established for originating and terminating legs for an AVS call, the RTX 102 switches (or duplicates) voice or data from the originating mobile 120 to all terminating mobiles 120.

The RTX 102 may use an IP network 124 or the Internet/Intranet 130 for two different purposes. The IP network 124 or the Internet/Intranet 130 can be used in a toll bypass mode where two RTXs 102 can exchange voice traffic bypassing the PSTN 106. However, each RTX 102 is responsible for terminating traffic to its closest MSC 104. In this case, the IP network 124 or the Internet/Intranet 130 is used as a backbone transport of voice traffic between two RTXs 102.

The IP network 124 or the Internet/Intranet 130 can also be used for a registration, presence and other applications, such as the Hybrid PTT solution as described in more detail below. For example, such applications may run over an IP stack in the mobile 120. After the mobile 120 registers for a data interface (i.e., obtaining an IP address) with the PDSN 126 (or equivalently, an SGSN (Serving GPRS Support Node) or GGSN (Gateway GPRS Support Node) in the case of GSM networks, or a PDSN (Packet Data Service Node) in the case of CDMA networks), the application in the mobile 120 registers with the RTX 102 using its IP address. The RTX 102 also uses this IP interface during the applications' sessions.

An alternative embodiment would use the SMS (Short Message Service) transport to carry messages over a data channel. The RTX 102 interacts with the mobile 120 using predefined application related messages that are transported as SMS messages. The same messages can be transported via the PDSN 126, or SGSN, or GGSN interfaces, if such interfaces are supported.

During roaming, an HLR (Home Location Register) 132 and VLR (Visitor Location Register) 134 can be accessed via the MSC 104 and an IS-41 link 136. The HLR 132 and VLR 134 are used to track the presence of members of a group within home or foreign networks and updates the mobiles 120 for those members with the network availability of other members of the group.

Real Time Exchange

Figure 2:
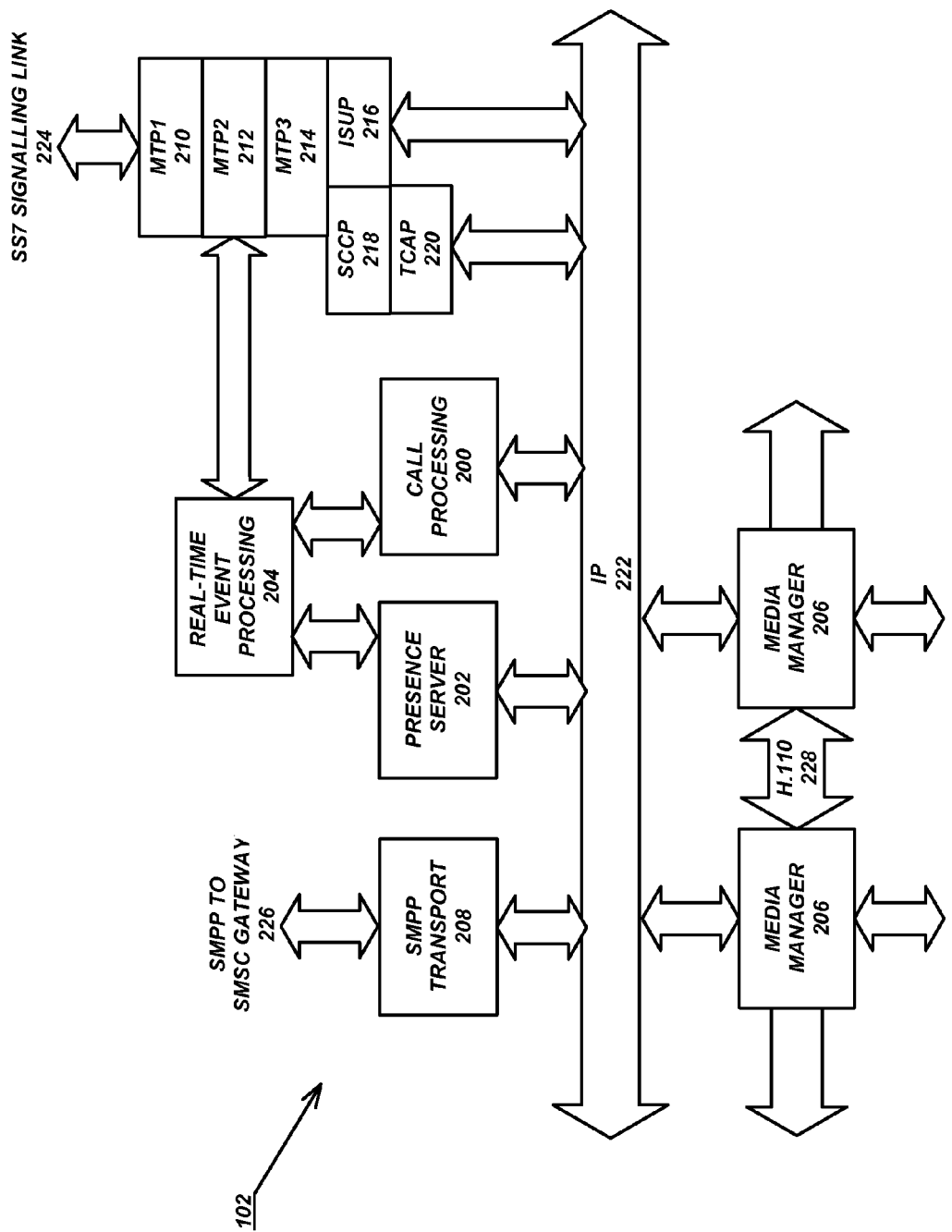
FIG. 2 illustrates a proposed architecture for a Real-Time Exchange according to the preferred embodiment of the present invention.

FIG. 2 illustrates a proposed architecture for the RTX 102 according to the preferred embodiment of the present invention.

The architecture includes a Call Processing system 200, Presence Server 202, Real-Time Event Processing system 204, one or more Media Managers 206, and an SMPP (Short Message Peer-to-Peer) Transport 208, as well as modules for various SS7 protocols, such as MTP-1 (Message Transfer Part Level 1) 210, MTP-2 (Message Transfer Part Level 2) 212, MTP-3 (Message Transfer Part Level 3) 214, ISUP (Integrated Services Digital Network User Part) 216, SCCP (Signaling Connection Control Part) 218, and TCAP (Transactions Capabilities Application Part) 220 protocols.

The Call Processing system 200, Presence Server 202, Media Managers 204, SMPP Transport 206, and other modules communicate across an IP network 222. The Real-Time Event Processing system 204 communicates directly with the Call Processing system 200, Presence Server 202, and the modules for various SS7 protocols. The modules for various SS7 protocols communicate with other entities via a SS7 Signaling Link 224. The SMPP Transport 206 communicates with a SMSC (Short Message Service Center) gateway using the SMPP protocol 226. The Media Managers 204 communicate among themselves using the H.110 protocol 228 (or some other protocol, such TCP/IP).

The operation of these various components are described in more detail below, as well as in the commonly-assigned patent applications cross-referenced above and incorporated by reference herein.

The originating mobile 120 signals the RTX 102 via the wireless network 100, e.g., by transmitting one or more configured DTMF (Dual Tone Multi Frequency) digits to the RTX 102. The Media Manager systems 206 receive the DTMF digits and pass the DTMF digits to the Call Processing system 200. The Call Processing (CP) system 200 determines whether the originating mobile 120 has subscribed to the AVS feature before originating the AVS call. Upon confirmation, the Call Processing system 200 initiates a new AVS call. The Call Processing system 200 interacts with the Presence Server 202 and Real-Time Event Processing system 204 to cause the wireless network 100 to perform call setup with the terminating mobiles 120 for the AVS call, and thereafter to manage the AVS call.

During the AVS call, the Call Processing system 200 interacts with the Media Manager systems 206 to maintain the H.110 channels 227 and assign any additional H.110 channels 228 required for the AVS call, which may span across multiple Media Manager systems 206. During the AVS call, the Media Manager systems 206 of the RTX 102 are used to mix audio streams between the originating mobile 120 and the terminating mobile 120, and then deliver these mixed audio streams to the originating mobile 120 and the terminating mobile 120. The H.110 channels 228 are used for passing mixed and unmixed audio streams voice between the Media Manager systems 200 as required.

Mobile Components

Figure 3:
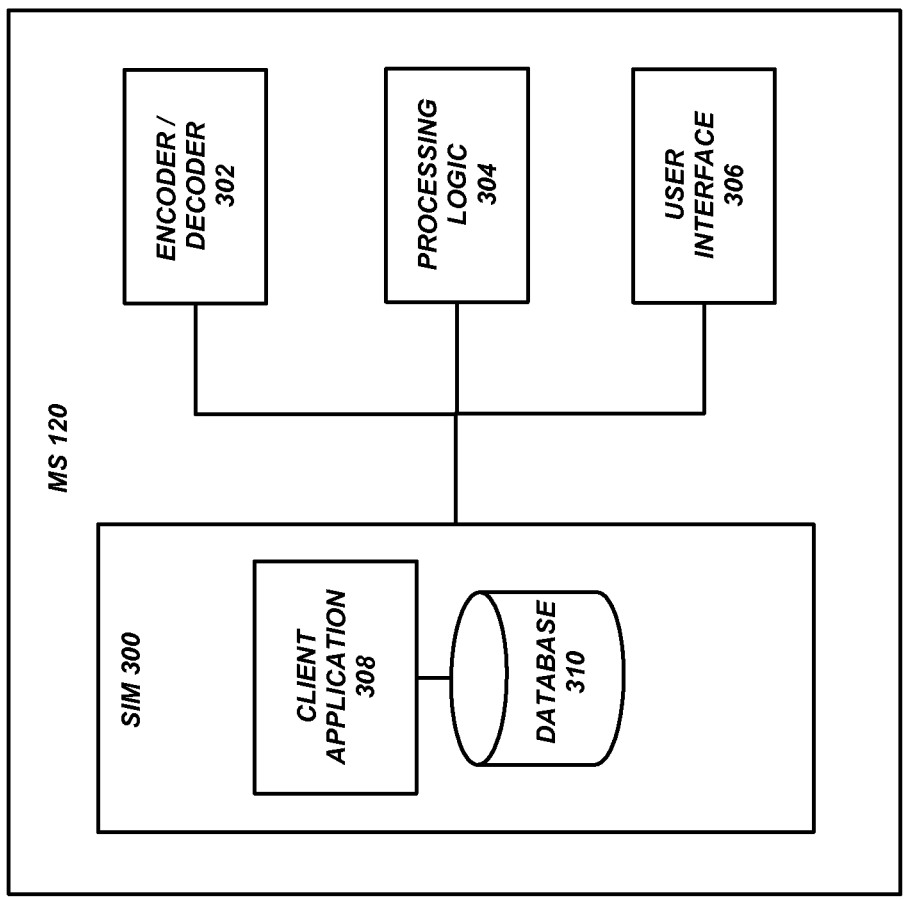
FIG. 3 illustrates the high-level functional components and their interfaces in a mobile station or handset according to a preferred embodiment of the present invention.

FIG. 3 illustrates the high-level functional components and their interfaces in the mobile 120 according to a preferred embodiment of the present invention.

Preferably, the mobile 120 includes a Subscriber Identity Module (SIM) 300 that is inserted into the mobile 120 to provide the wireless phone service. The SIM 300 stores some of the logic and data required of the mobile 120 for providing cellular service, including the functions necessary for supporting AVS functionality, namely the Hybrid PTT call. In addition, the SIM 132 stores contact and group information, and other user information for use by the mobile 120.

The high-level functional components of the mobile 120 include an encoder/decoder 302, processing logic 304 and user interface 306. A client application 308 is provided on the SIM 300 that supports the AVS functionality for the mobile 120. In addition, the SIM 300 stores a database 310, which includes an address book, AVS contacts and/or group information.

At power-on, the mobile 120 loads the client application 308 necessary to support the AVS functionality. This functionality provided includes the "look and feel" of the menu displays on the mobile 120, as well as user interaction with the menu displays.

During operation, the encoder/decoder 302 decodes and encodes messages, and populates specific data structures in the mobile 120. The encoder/decoder 302 checks the validity of the incoming messages by verifying mandatory parameters for each of the incoming messages. A message will not be processed further if the encoder/decoder 302 fails to decode the message.

The processing logic 304 handles all the AVS functionality. The processing logic 304 implementation is device-specific and vendor-specific, and it interacts with the other components, including the encoder/decoder 302, user interface 306, client application 308 and database 310.

The processing logic 304 provides an auto-answer mechanism for the AVS functionality. Specifically, when a call is received, the processing logic 304 automatically answers the call. The processing logic 304 makes use of call notification for incoming call detection and, based on various parameters received within the call notification, determines whether the call is an AVS call. If the call is an AVS call, then the processing logic 304 uses "AT" commands to answer the AVS call and turn on the speaker of the mobile 120. (All of this takes place within a certain time period.) On the other hand, if the call is not an AVS call, then normal call processing is performed by the mobile 120.

The processing logic 304 also provides "floor control" using DTMF tone control. In Hybrid PTT calls, which are half-duplex, a determination of who may talk is based on who has the "floor." Using the processing logic 304 provided in the mobile 120, appropriate DTMF tones are sent to the RTX 102 in accordance with specific key sequences (i.e., pressing and/or releasing a Hybrid PTT key) that indicate whether the "floor" has been requested and/or released by the user.

In addition, the processing logic 304 provides SMS destination control based on the type of subscriber. At the time of subscriber data provisioning, if it is determined that the mobile 120 will use AVS based logic, then appropriate logic is invoked in the RTX 102 to send presence messages over SMS to the mobile 120. Similarly, the mobile 120 is configured at the time of provisioning to receive/accept such SMS and respond to the RTX 102 appropriately.

Finally, the processing logic 304 also enables subscribers to track the presence of fellow members of the group in the network 100 on their mobile 120, and provides a mechanism and API to carry-out contacts and group management operations on the mobile 120, such as add member, delete member, etc.

Since most of the presence information is stored in the database 310, the database 310 is tightly integrated with the processing logic 304. The database 310 stores groups, contacts, presence and availability related information. The database 310 information essentially contains group and member information along with presence information associated with each group and member. Apart from group and member information, the database 310 also stores subscriber information, such as privileges, presence information, etc. The other components of the mobile 120 may interact with the database 310 to retrieve/update the group, members and presence information for various operations. The database 310 also has pointers to the native address book on the mobile 120, to provide seamless "alias" naming for contacts used with cellular calls, as well as AVS features.

The user interface 306 provides a mechanism for the user to view and manage groups, group members, contacts, presence and availability. The user interface 306 also makes it possible to invoke the AVS features from the group/contact list screens, as described in more detail below.

Hybrid Push-to-Talk (PTT)

The Hybrid PTT call achieves two objectives: faster PTT call setup times as compared to other PTT calls and a consistent voice quality and user experience across the entire network as compared to other PTT calls.

Faster call setup is achieved by carrying the first talkburst or volley (i.e., voice packet) from the originating mobiles of the Hybrid PTT call to the terminating mobiles on pre-established IP sessions. The circuit channels are established among the same mobiles in parallel. Subsequent talkbursts or volleys are carried over the circuit channels.

Consistent voice quality and user experience is accomplished using the same mechanisms. This contrasts with current VoIP based PTT solutions that suffer from "degradation to lowest subscriber quality." In current VoIP based PTT solutions, if one mobile in a PTT call experiences low quality data rates, all the users will have the same experience. This automatic group degradation becomes necessary to provide an equitable user experience and prevent starving of the user with the lowest quality.

In one embodiment, in order to derive full benefits from the Hybrid PTT call, the Hybrid PTT clients present in the mobiles have to meet the following pre-conditions:

At the time of starting the Hybrid PTT call, the originating mobile has to be in an EGPRS/3G (Enhanced General Packet Radio Service/3$^{rd}$ Generation) coverage area.

Among the invited participants, only those that are in the EGPRS/3G coverage are will receive the initial talkburst on a pre-established IP session.

All participants whose mobile clients are not in an EGPRS/3G coverage area will receive the PTT talkburst after the establishment of circuit channels.

Only Dual Transfer Mode (DTM) capable handsets (i.e., Pseudo Class A mobiles) would benefit from the Hybrid PTT call.

However, such requirements may not be necessary in alternative embodiments.

Hybrid PTT Architecture

Simple Scenario

Figure 4:
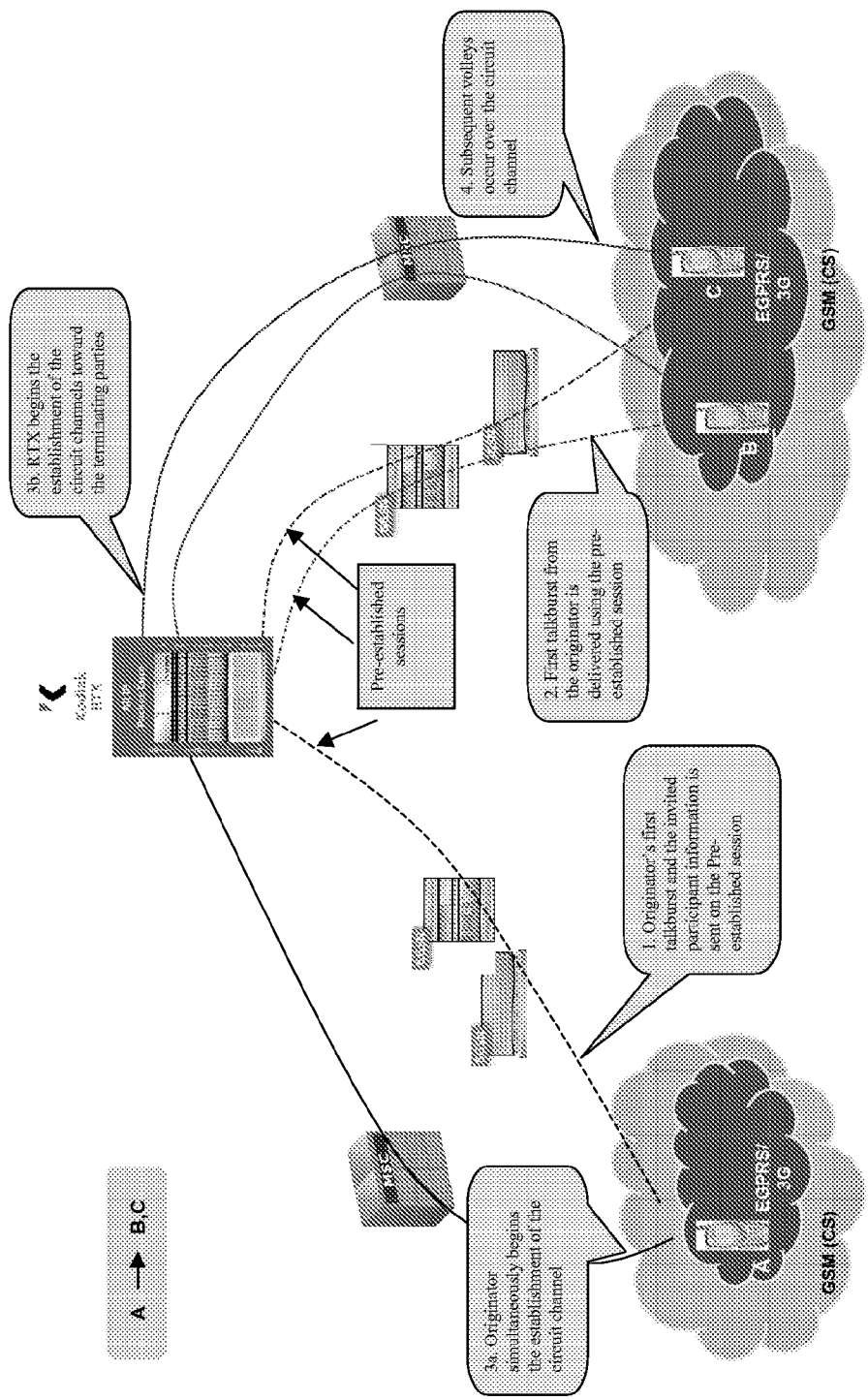
FIG. 4 is an illustration of an exemplary system used for the Hybrid Push-to-Talk according to one embodiment of the present invention.

FIG. 4 is an illustration of an exemplary system used for the Hybrid PTT call according to one embodiment of the present invention.

The Group Home RTX acts as the controller of the Hybrid PTT session. In this simple scenario, each Hybrid PTT client in a mobile or handset pre-establishes one or more IP sessions (indicated by the dashed lines) with its own Home RTX via an SGSN and GGSN, and all Hybrid PTT calls are routed through the Group Home RTX. The Group Home RTX serves as the focus for both the initial volley over the pre-established IP sessions, as well as for subsequent volleys over circuit channels (indicated by the solid lines) established through an MSC. Any Hybrid PTT calls originated off-net are also routed to the Group Home RTX via a Roaming Gateway (shown in FIG. 12), for example.

In the example of FIG. 4, handsets A, B and C are in an EGPRS/3G network and each have a pre-established IP session with the RTX. A is the originator, and B and C are the terminating parties.

In step 1 of FIG. 4, the originator's first talkburst and the invited participant information is sent on the pre-established IP session through the SGSN and GGSN to the RTX.

In step 2 of FIG. 4, the first talkburst from the originator is delivered by the RTX to one or more of the terminating parties using the pre-established IP sessions.

In step 3a of FIG. 4, the originator simultaneously begins the establishment of the circuit channels with the terminating parties via the RTX.

In step 3b of FIG. 4, the RTX begins the establishment of the circuit channels to the terminating parties.

In step 4 of FIG. 4, subsequent volleys occur over the circuit channels via the MSC.

Figure 5:
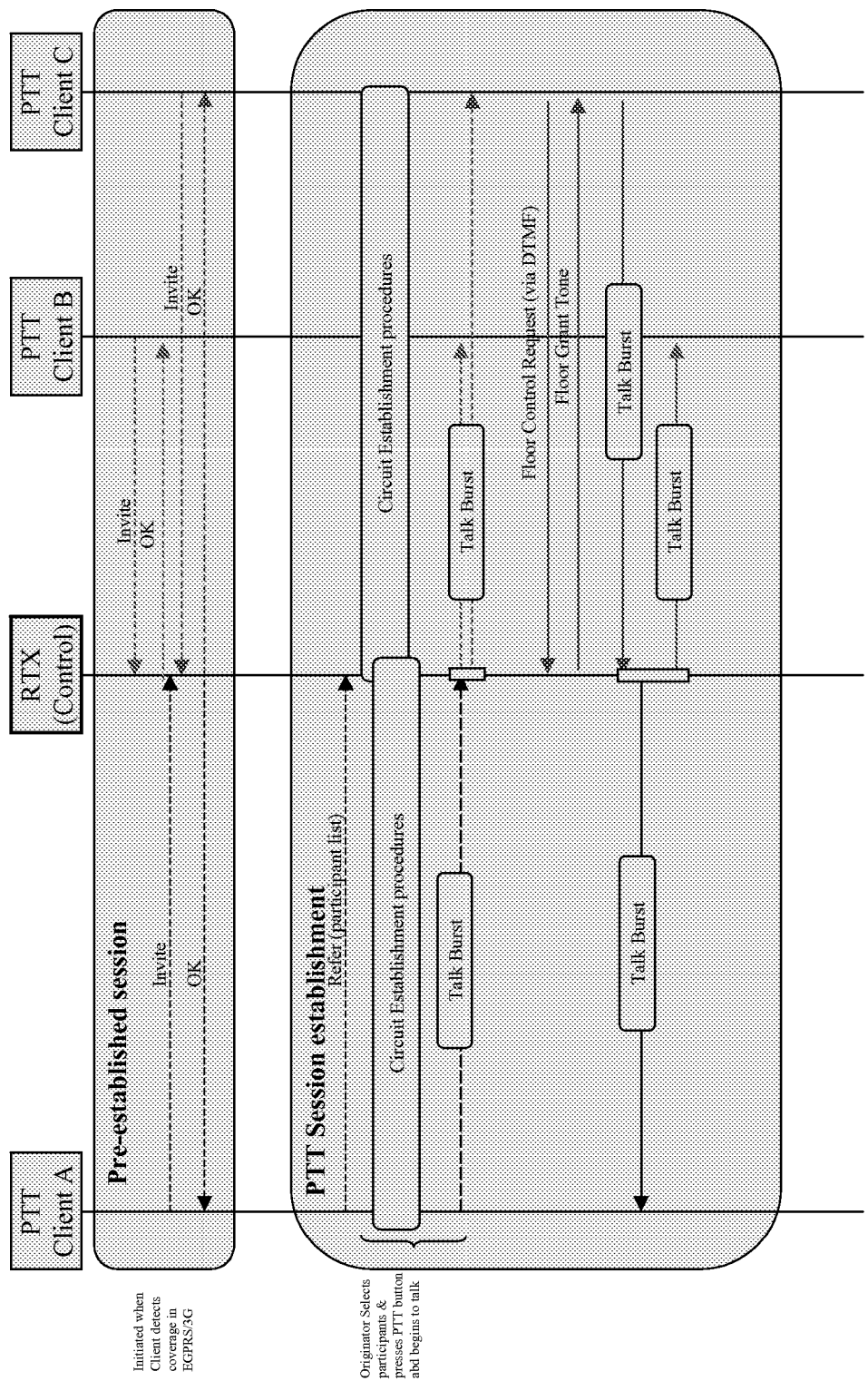
FIG. 5 is a call flow illustrates the process of establishing the Hybrid Push-to-Talk call according to one embodiment of the present invention.

FIG. 5 is a call flow that also illustrates the process of establishing the Hybrid PTT call according to one embodiment of the present invention.

1. When the Hybrid PTT client in the handset detects coverage in an EGPRS/3G network, it establishes an IP connection with the RTX. This IP connection is active so long as the Hybrid PTT client is active.

2. A originates a Hybrid PTT call to B and C.

4. A's first talkburst and intended recipients information is sent to the RTX via the pre-established IP session.

5. A simultaneously begins the establishment of the circuit channels with the RTX.

6. The RTX establishes the circuit channels between the originator and terminating parties.

7. The first talkburst from A is delivered to B and C via the pre-established IP sessions.

8. The circuit channels are established between the originator and the terminating parties.

9. Subsequent volleys are transmitted via the circuit channels.

10. Once the first talkburst is played at the terminating parties, the RTX plays a "floor available" tone for the terminating parties. One of the terminating parties acquires the floor and starts speaking, and these talkbursts are sent via the circuit channels. Note that, by that time, the RTX is playing the "floor available" tone. After playing the first talkburst, if the circuit channel is not established, then the Hybrid PTT client continues to use the pre-established IP channels for further talkbursts. Once the circuit channels are established, the Hybrid PTT client will start using the circuit channels for subsequent talkbursts.

Optimization

Figure 6:
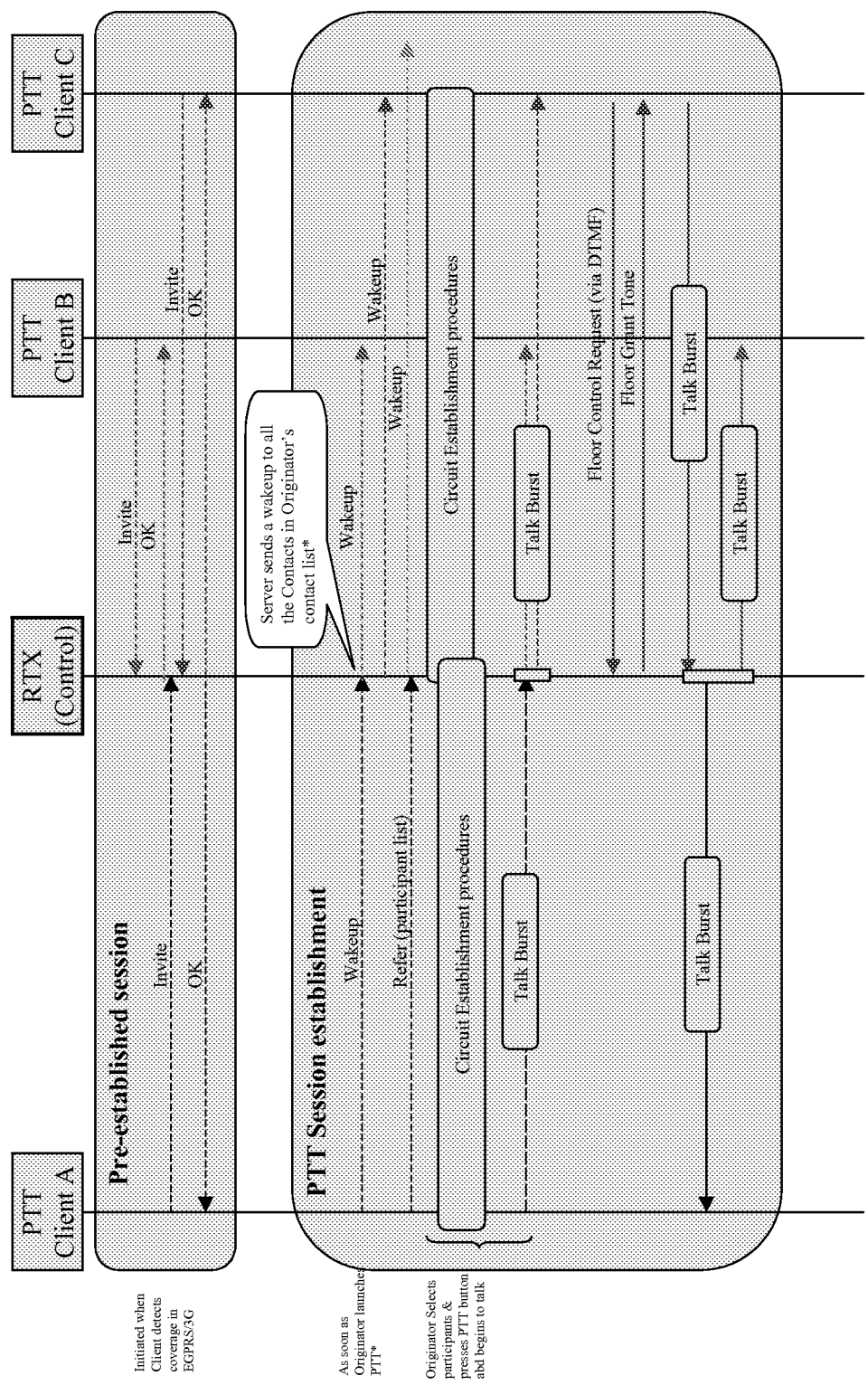
FIG. 6 is a call flow illustrates the process of establishing the Hybrid Push-to-Talk call using optimization according to one embodiment of the present invention.

FIG. 6 is a call flow illustrates the process of establishing the Hybrid PTT call using optimization according to one embodiment of the present invention.

The call flow scenario in this situation is the same as shown in FIG. 5. However, with regard to optimization, there may be situations where the handsets for a terminating party may not be active in an IP session, or the terminating party might have established an IP session with RTX long before the originator. When the user logs into the Hybrid PTT client, it sends a "wakeup" message to the RTX and the RTX sends a wakeup message to all of the other group members, in order to place them in a "Ready" state to receive the first talkburst anytime. This also helps to speed up the establishment of the circuit channels.

Preconditions for Hybrid PTT

Currently, in order to derive full benefits from the Hybrid PTT calls of the present invention, the Hybrid PTT clients have to meet the following pre-conditions:

When the Hybrid PTT call begins, the originating client has to be in EGPRS/3G coverage.

Among the invited participants, only those that in an EGPRS/3G coverage area receive the initial talkburst on the pre-established IP session.

All participants whose Hybrid PTT clients are not in an EGPRS/3G coverage area receive the Hybrid PTT talkburst after establishment of the circuit channels has completed.

Only Dual Transfer Mode (DTM) capable handsets (Class A) would currently benefit from the Hybrid PTT call.

Multiple RTX Scenario

Figure 7:
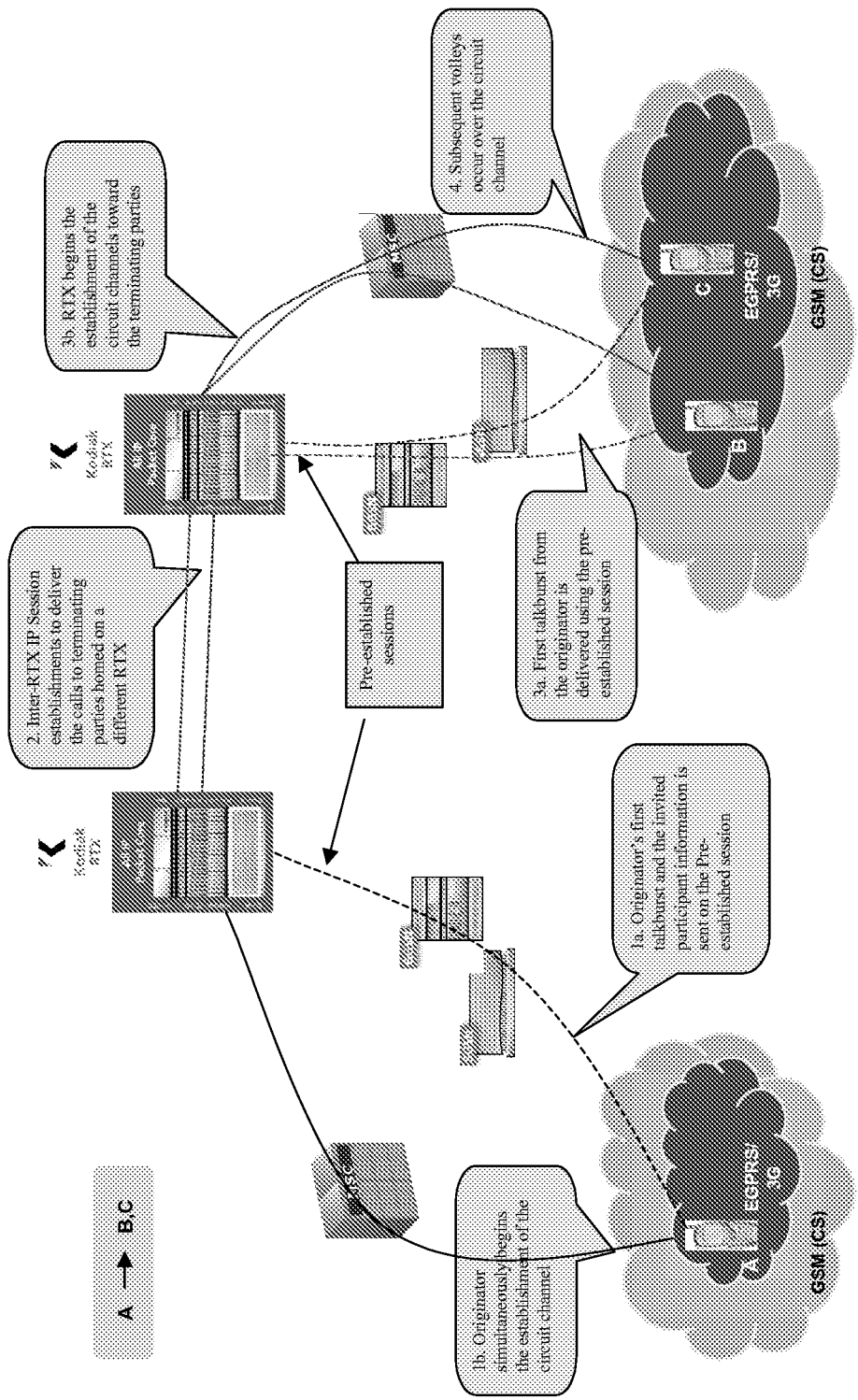
FIG. 7 is an illustration of an exemplary system using multiple Real-Time Exchanges for the Hybrid Push-to-Talk call according to one embodiment of the present invention.

FIG. 7 is an illustration of an exemplary system using multiple RTXs for the Hybrid PTT call according to one embodiment of the present invention.

There are possibilities that more than one RTX will be in service in a network. Some of the Hybrid PTT clients are latched or homed to one RTX and others of the Hybrid PTT clients are latched or homed to a different RTX. When a user latched to a first RTX originates a call to the terminating party latched to a second RTX, an inter-RTX IP session is established to handle communications between the RTXs.

In step 1a of FIG. 7, an originator's first talkburst and the invited participant information is sent on the pre-established IP session through the SGSN and GGSN to the RTX.

In step 1b of FIG. 7, the originator simultaneously begins the establishment of the circuit channels through the MSC to the RTX.

In step 2 of FIG. 7, an inter-RTX IP session is established to deliver the calls to terminating parties latched or homed on a different RTX.

In step 3a of FIG. 7, the first talkburst from the originator is delivered to one or more of the terminating parties using the pre-established IP sessions.

In step 3a of FIG. 7, the originator simultaneously begins the establishment of the circuit channels with the terminating parties.

In step 3b of FIG. 7, the RTX begins the establishment of the circuit channels to the terminating parties.

In step 4 of FIG. 7, subsequent volleys occur over the circuit channels via the MSC.

Figure 8:
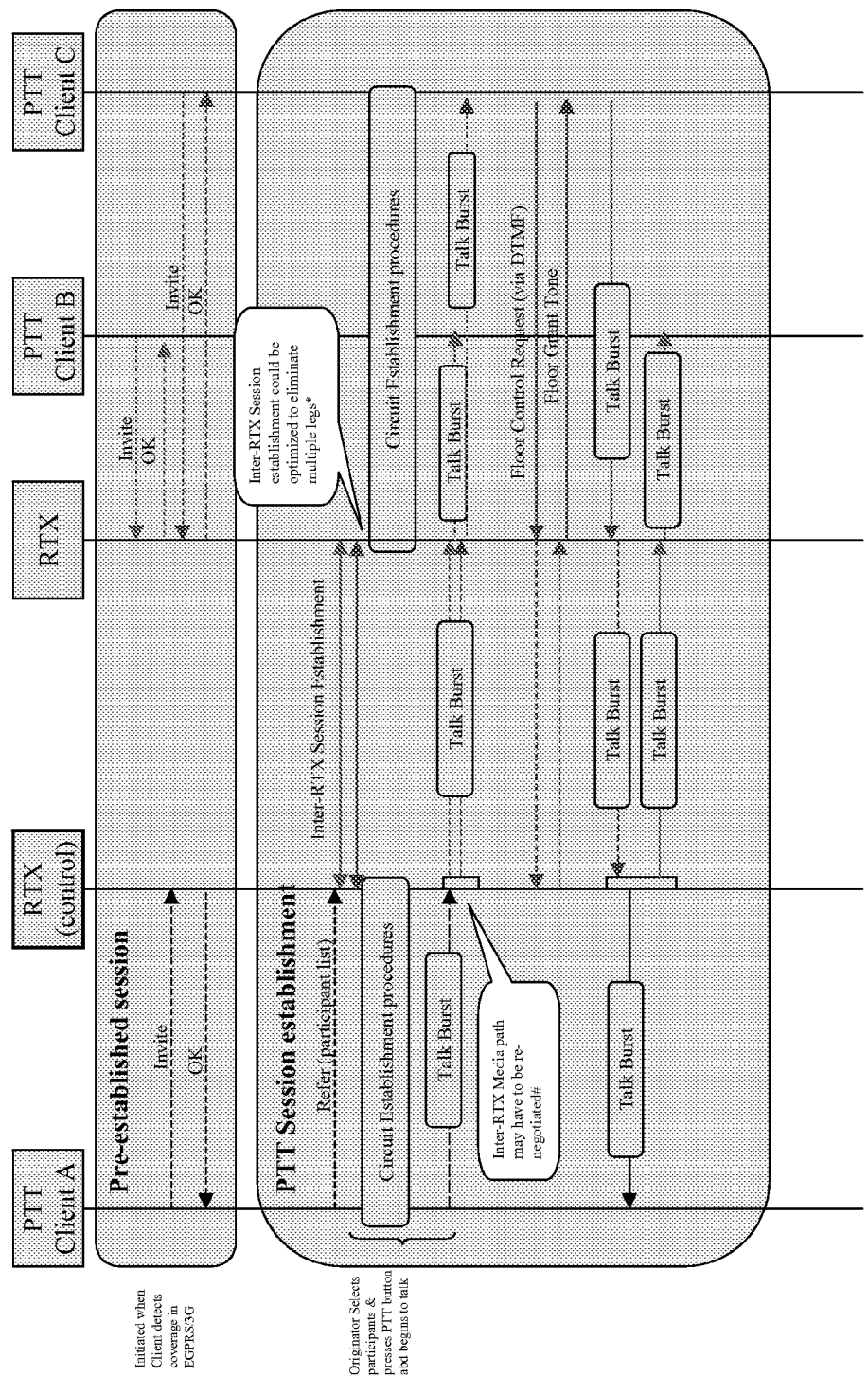
FIG. 8 is a call flow illustrates the process of establishing the Hybrid Push-to-Talk call using multiple Real-Time Exchanges according to one embodiment of the present invention.

FIG. 8 is a call flow illustrates the process of establishing the Hybrid PTT call using multiple RTXs according to one embodiment of the present invention. In this embodiment, handsets A, B and C are all in an EGPRS/3G coverage area and all include a Hybrid PTT client. Handset A is homed or latched to a first RTX, and handsets B and C are homed or latched to a second RTX.

1. When the Hybrid PTT client in the handset detects coverage in an EGPRS/3G network, it establishes an IP session with the RTX. This IP session is active so long as the Hybrid PTT client is active.

2. A originates a Hybrid PTT call to B and C.

3. A's first talkburst and intended recipients information is sent to the first RTX via the pre-established IP session.

4. A simultaneously begins the establishment of the circuit channel with the first RTX.

7. The first RTX knows that B and C are not latched or homed to it. It queries other RTXs in the network and obtains a positive response from the second RTX.

8. The first RTX establishes an IP session with the second RTX.

9. The Hybrid PTT call is terminated to B and C in the pre-established IP sessions via the second RTX.

10. The first RTX establishes the circuit channels between the originator and terminating parties via the second RTX.

11. The first talkburst from A is delivered to B and C via the pre-established IP sessions.

12. Once the circuit channels are established between the originator and terminating parties, subsequent volleys are transmitted via the circuit channels.

Note that, although multiple RTXs are involved, the RTX with which the originator is latched or homed will have complete control over the Hybrid PTT call.

Hybrid PTT in Diverse Conditions

Note that in this embodiment, when parties are in different coverage areas, i.e., some in GPRS and others in EGPRS/3G, the following rules generally apply to the Hybrid PTT solution:

If the originator is not in an EGPRS/3G coverage area, the Hybrid PTT solution will fallback to the circuit channels even for the first volley.

Even if the originator is in an EGPRS/3G coverage area, the Hybrid PTT may start in the IP session, but fall back to the circuit channels due to coverage issues even for the first volley.

Terminating parties camped on EGPRS/3G can still receive the initial talkburst on their pre-established IP session.

All terminating parties not camped on an EGPRS/3G coverage area will receive the initial talkburst on circuit channels.

Mobiles not capable of DTM will be treated as being outside of an EGPRS/3G coverage area.

However, such rules may not be necessary in alternative embodiments.

Hybrid PTT Use Cases

Initial Volley Delivery

FIGS. 9A, 9B, 9C and 9D are illustrations of initial volley delivery for the Hybrid PTT call according to one embodiment of the present invention.

Figure 9A:
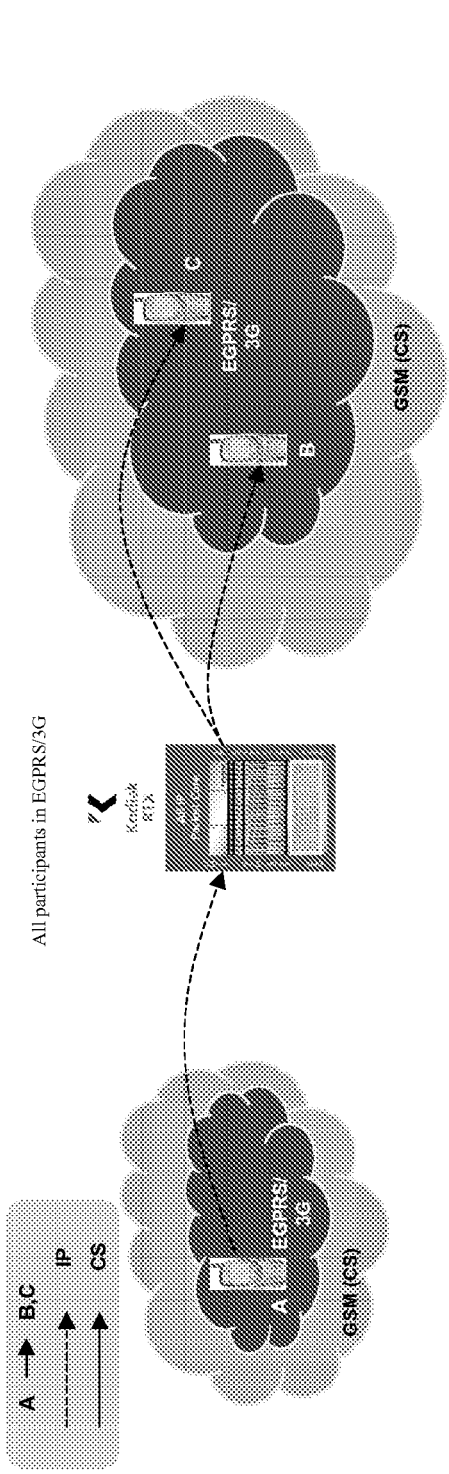
Figure 9B:
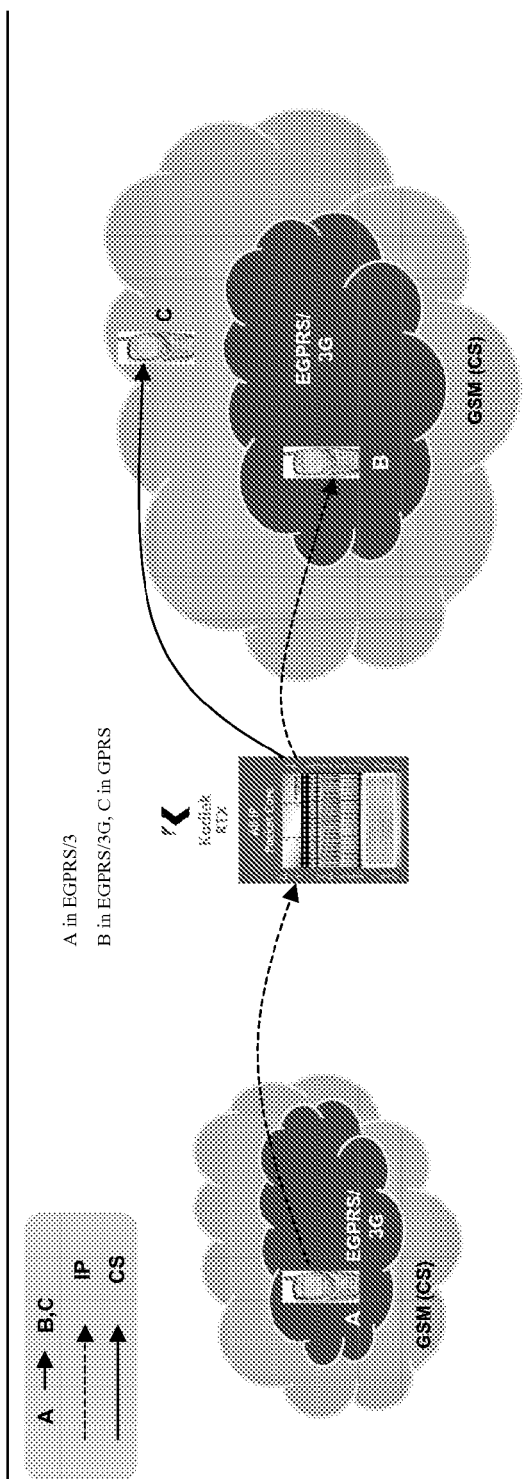

In this regard, FIG. 9A shows all participants in EGPRS/3G environments; FIG. 9B shows originator A and terminating party B in an EGPRS/3G environment and terminating party C in a GPRS environment; FIG. 9C shows originator A in an EGPRS/3G environment and terminating parties B and C in a GPRS environment; and FIG. 9D shows originator A in a GPRS environment and terminating parties B and C in an EGPRS/3G environment.

Case 1: FIG. 9A
1. All the handsets are in an EGPRS/3G network.
2. The first talkburst of the Hybrid PTT call is transmitted via the pre-established IP sessions. Once the circuit channels are established, subsequent volleys are transmitted via the circuit channels.

Case 2: FIG. 9B
1. Handset A (originator) and handset B (one of the terminating parties) are in an EGPRS/3G network, but handset C is not in an EGPRS/3G network.
2. The first talkburst of the Hybrid PTT call is transmitted via the pre-established IP channels between A and B, and via the circuit channel between A and C. Once the complete circuit channel is established, subsequent volleys are transmitted via the circuit channels between A, B and C.

Case 3: FIG. 9C
1. Handset A is in an EGPRS/3G coverage area, and handset B and C are not in an EGPRS/3G coverage area.
2. A originates a Hybrid PTT call to B and C. The first volley from originator to the RTX is transmitted via the pre-established IP channel. The RTX establishes circuit channels to B and C, and it transmits the first volley in the circuit channels.
3. Once the circuit channels are established, all subsequent volleys are transmitted via the circuit channels.

Case 4: FIG. 9D
1. Handset A is not in an EGPRS/3G coverage area, and handsets B and C are in an EGPRS/3G coverage area.
2. A originates a Hybrid PTT call to B and C. The first volley from A to the RTX is transmitted via a circuit channel. B and C receive the first volley via the pre-established IP sessions.
3. Once the circuit channels are established, all the subsequent volleys are transmitted via the circuit channels.

End-to-End Setup Times

Note that it is possible that mobiles in EGPRS will not be DTM enabled. In such a case, the RTX will deliver the first volley over the IP session (to the terminating party) and the Hybrid PTT client on the terminating mobile will originate a circuit channel setup to the RTX after receiving the last voice packet. Similarly, the Hybrid PTT client on the originating mobile will begin circuit channel originations as soon as the last voice packet has been transmitted.

Note also that the RTX will learn about the DTM capability of a mobile dynamically during the signaling exchange with the Hybrid PTT client on the mobile. Depending on this information, the RTX will either use normal circuit channel termination (i.e., page, etc.) or wait for an origination from the Hybrid PTT client on the mobile.

Finally, note that for cases where the mobiles for terminating parties are non-DTM enabled and involved in a current voice call, the timeout waiting for an acknowledgement to "Invite" will cause a normal circuit channel termination towards such Hybrid PTT clients.

Hybrid PTT Launched from Contact List

Figure 10:
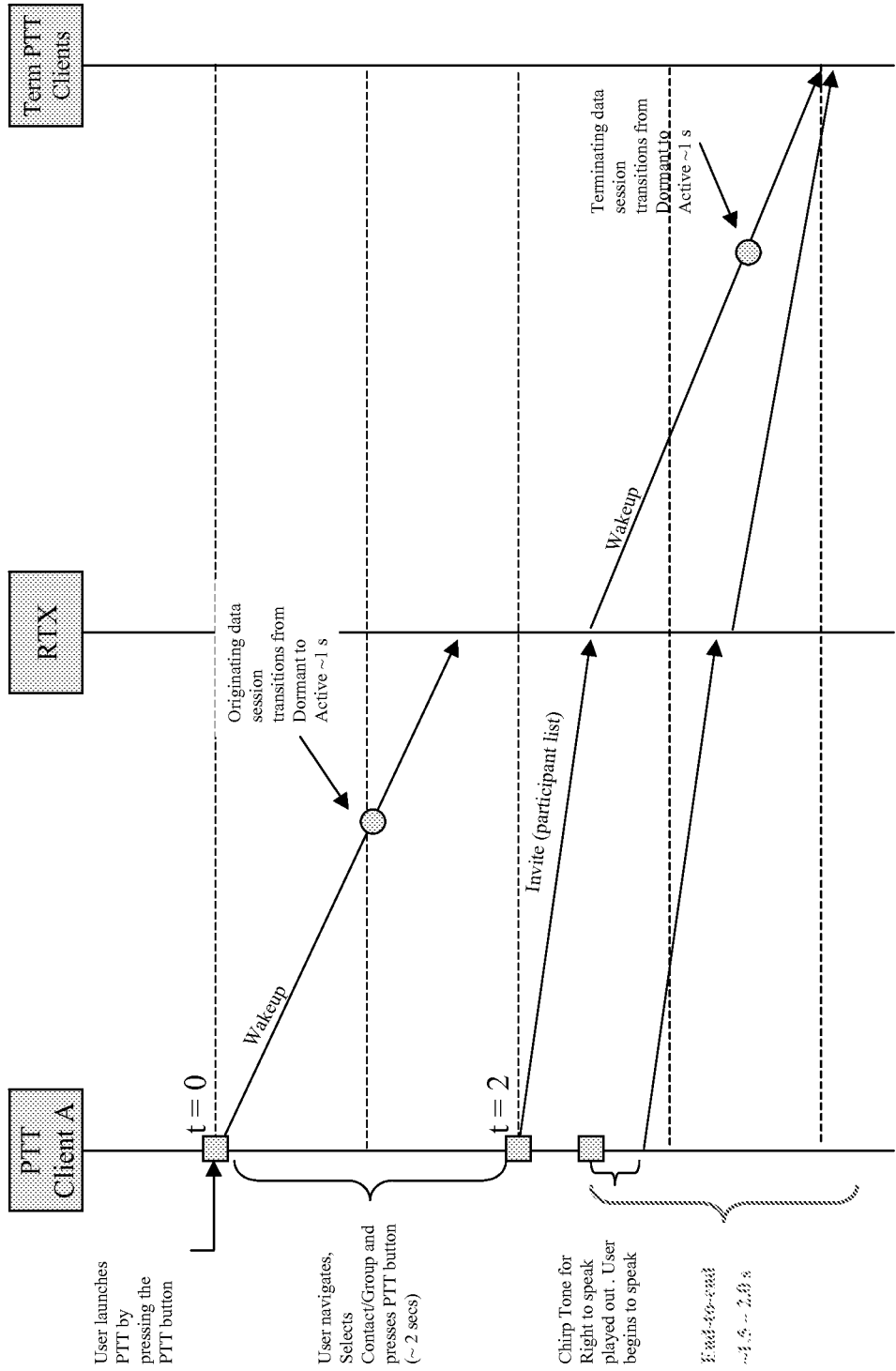
FIG. 10 is a flowchart that illustrates the end-to-end setup times for establishing the Hybrid Push-to-Talk call when launched from a contacts list in the originator's mobile.

FIG. 10 is a flowchart that illustrates the end-to-end setup times for establishing the Hybrid PTT call when launched from a contacts list in the originator's mobile.

1. At time t=0, the user launches the Hybrid PTT client by pressing the Hybrid PTT button. The Hybrid PTT client establishes an IP session with the RTX.

2. The user navigates a contact list, selects the desired contacts or groups, and presses the Hybrid PTT button at time t=2. The Hybrid PTT client sends a "wakeup" message to the RTX and the pre-established IP session become actives (approximately 1 second).

3. A participants list is sent by the Hybrid PTT client to the RTX. The RTX then sends a "wakeup" message to each of the terminating parties and their IP sessions become active (approximately 1 second).

4. From time t=2, it takes approximately 1.5-2 seconds to setup an end-to-end Hybrid PTT call.

Hybrid PTT Launched from Call History

Figure 11:
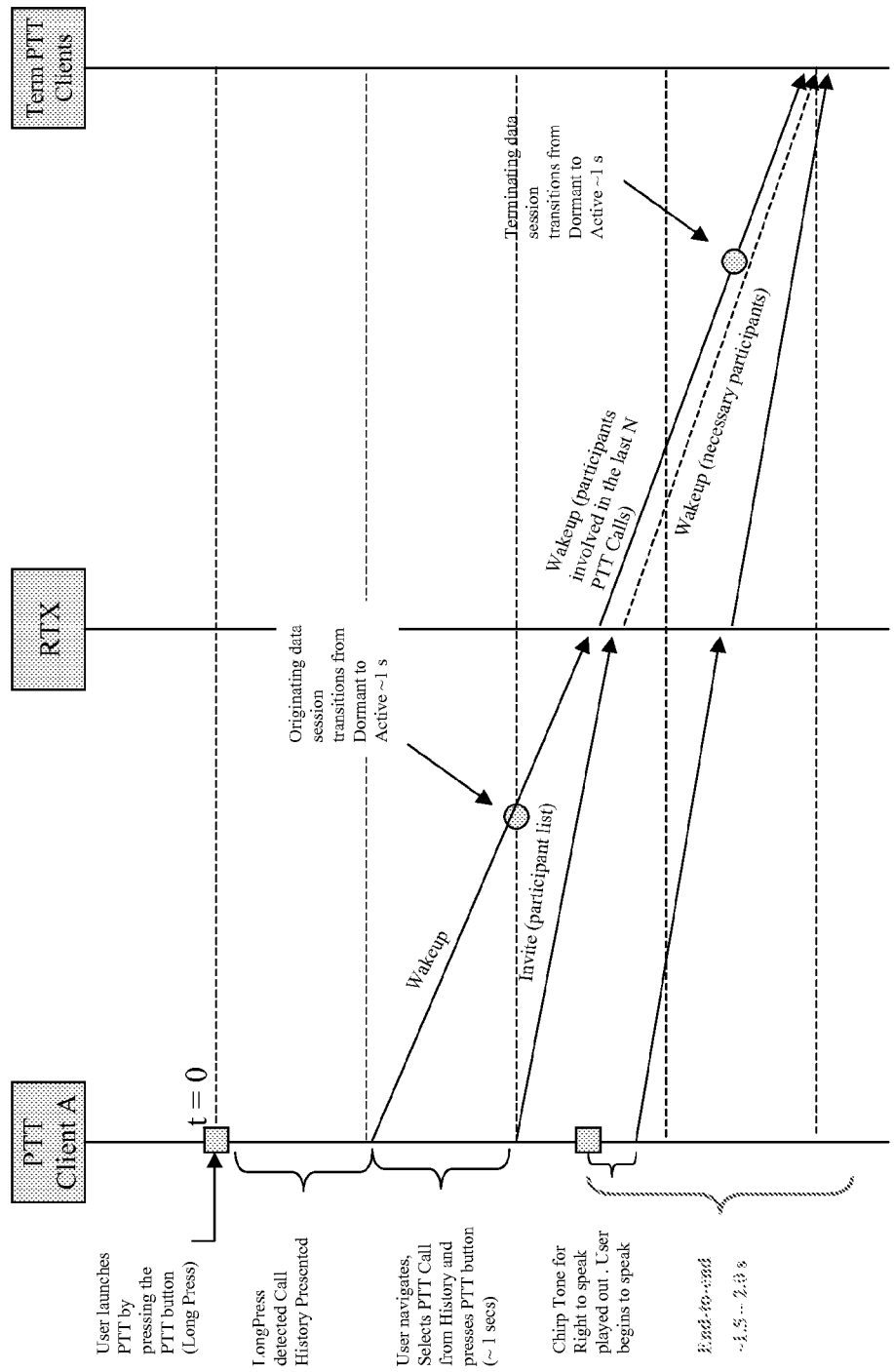
FIG. 11 is a flowchart that illustrates the end-to-end setup times for establishing the Hybrid Push-to-Talk call when launched from a call history list in the originator's mobile.

FIG. 11 is a flowchart that illustrates the end-to-end setup times for establishing the Hybrid PTT call when launched from a call history list in the originator's mobile.

1. At time t=0, the user launches the Hybrid PTT client by pressing the Hybrid PTT button (e.g., a long press). The Hybrid PTT client establishes an IP session with the RTX.

2. The long press of the Hybrid PTT key is detected by the handset, which results in the display of the Hybrid PTT call history.

3. The user selects an entry from Hybrid PTT call history and presses Hybrid PTT button at time t=2. The Hybrid PTT client sends a wakeup message to the RTX and the pre-established IP session becomes active (approximately 1 second).

4. A participants list is sent by the Hybrid PTT client to the RTX. The RTX sends a "wakeup" message to each of the terminating parties, which results in their IP sessions becoming active (approximately 1 second).

5. From time t=2, it takes approximately 1.5-2 seconds to setup an end-to-end call.

Group Home RTX as Controller

Figure 12:
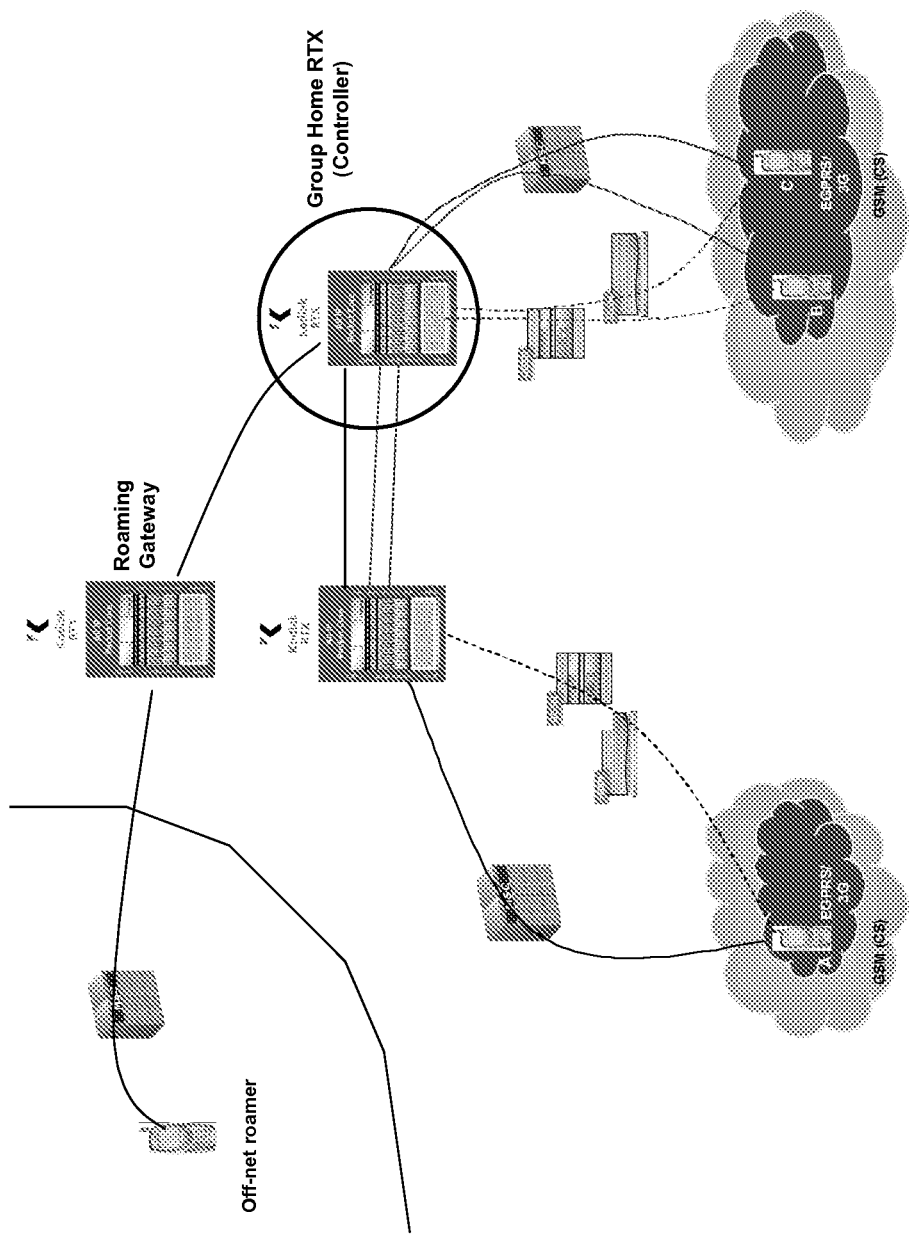
FIG. 12 is an illustration of an exemplary system using a Group Home Real-Time Exchange as a controller for the Hybrid Push-to-Talk call, which includes a Roaming Gateway and an off-net roamer.

FIG. 12 is an illustration of an exemplary system using a Group Home RTX as a controller for the Hybrid PTT call, which includes a Roaming Gateway and an off-net roamer.

As noted previously, each Hybrid PTT client will pre-establish an IP session with its own Home RTX. All Hybrid PTT calls will be routed through the Group Home RTX, and the Group Home RTX will serve as a the focus for both the initial volley over the IP session as well as for subsequent volleys over circuit channels. However, Hybrid PTT calls originated off-net will be routed to the Group Home RTX via the Roaming Gateway.

Hybrid PTT Origination by Terminating Clients

Figure 13:
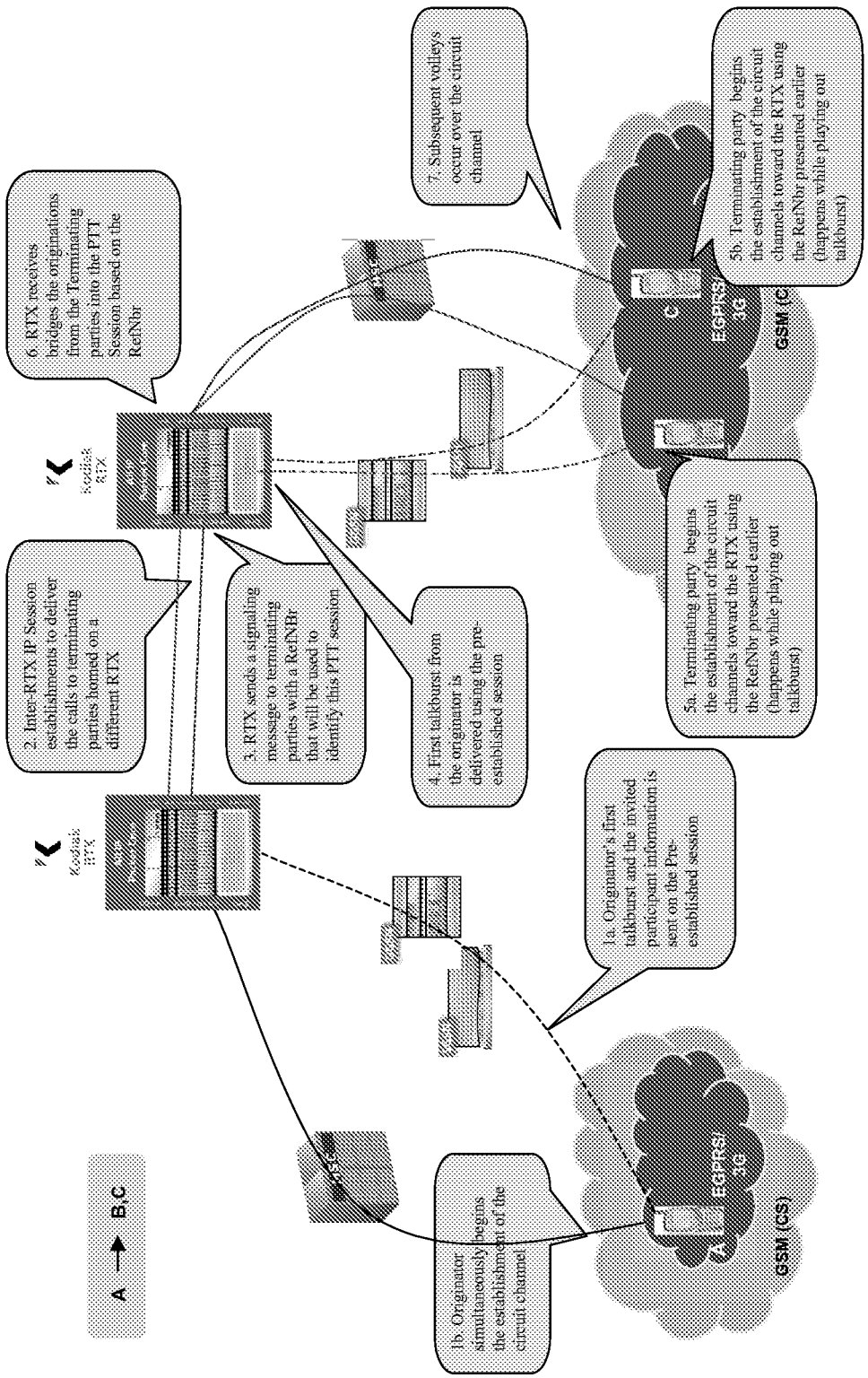
FIG. 13 is an illustration of an exemplary system where terminating Hybrid Push-to-Talk clients originate their own Hybrid Push-to-Talk calls.

FIG. 13 is an illustration of an exemplary system where terminating Hybrid PTT clients originate their own Hybrid PTT calls. In this embodiment, handsets A, B and C are all in an EGPRS/3G coverage area and all include a Hybrid PTT client. Handset A is latched to a first RTX and handsets B and C are latched to a second RTX.

When the Hybrid PTT client in the handset detects coverage in an EGPRS/3G network, it establishes an IP connection with the RTX. This IP connection is active so long as the Hybrid PTT client is active.

In step 1a of FIG. 13, A originates a Hybrid PTT call to B and C, wherein the originator's first talkburst and the invited participant information is sent on the pre-established IP session through the SGSN and GGSN to the RTX.

In step 1b of FIG. 13, the originator A simultaneously begins the establishment of the circuit channels for the Hybrid PTT call through the MSC to the first RTX.

In step 2 of FIG. 13, the first RTX knows that B and C are not latched or homed to it, so it queries other RTXs in the network, and receives a positive response from the second RTX, and the first RTX establishes an inter-RTX IP session with the second RXT to deliver the calls to terminating parties homed on the second RTX.

In step 3 of FIG. 13, the Hybrid PTT call is terminated to B and C using their pre-established IP sessions via the second RTX. The second RTX also sends a signaling message to the terminating parties with a RefNbr (Reference Number) that is used to identify the Hybrid PTT call.

In step 4 of FIG. 13, the first talkburst from the originator A is delivered to one or more of the terminating parties B and C using the pre-established IP sessions.

In step 5a of FIG. 13, the terminating parties B and C begin the establishment of the circuit channels toward the second RTX using the RefNbr received earlier (this occurs while playing the talkburst).

In step 6 of FIG. 13, the second RTX receives and bridges the circuit channels from the terminating parties B and C into the Hybrid PTT call based on the RefNbr.

In step 7 of FIG. 13, once the circuit channels are established between the originator A and terminating parties B and C, subsequent volleys are transmitted over the circuit channels via the MSC.

A major advantage of allowing the terminating parties to originate and join a Hybrid PTT call is that the Hybrid PTT client will be able to coordinate deterministically the timing of establishing the circuit channels. This would be beneficial for Hybrid PTT clients that are non-DTM capable, where the clients would ensure that the timing of the origination does not interrupt (suspend) the initial talkburst. A traditional termination attempt from the RTX toward a non-DTM capable Hybrid PTT client may even be unsuccessful (i.e., the client is not listening to paging) while the initial talkburst is being delivered.

Hybrid PTT for Non-DTM Enabled Clients

Hybrid PTT clients that non-DTM capable (e.g., EGPRS coverage DTM is not enabled) will be handled using the following two options:

1. The first volley is delivered using the IP session and the terminating party originates a circuit channel to the RTX without compromising the simultaneous packet talkburst.

2. All Hybrid PTT clients that are recognized as non-DTM capable by the RTX will be included in Hybrid PTT calls by establishing traditional circuit channels.

In the case of #1 above, a Hybrid PTT client that is in the middle of a circuit channel call (which could even be another PTT session) should inform the RTX, so that the RTX would not attempt delivery of initial talkburst over the IP session.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

For example, while the solution refers to the 3GPP ($3^{rd}$ Generation Partnership Project) family of technologies, such as GPRS and UMTS, it is equally applicable and can be applied to the 3GPP2 ($3^{rd}$ Generation Partnership Project 2) family of technologies, such as 1x and EVDO Rev A.

What is claimed is:

1. A system for providing advanced voice services in a cellular telephone network, comprising:

a cellular telephone network for making calls between mobiles, wherein the calls are initiated by call setup and in-band signaling within the cellular telephone network and voice frames for the calls are switched between the mobiles by one or more mobile switching centers across bearer paths in the cellular telephone network, at least one real-time exchange that interfaces to at least one of the mobile switching centers in the cellular telephone network to provide advanced voice services therein, the advanced voice services providing instant two-way half-duplex voice messaging within a group of users of the cellular telephone network, the instant two-way half-duplex voice messaging comprises a Hybrid Push-to-Talk (PTT) call, wherein one or more first or initial talkbursts or volleys comprising voice packets are transmitted by the real-time exchange from an originating mobile to one or more terminating mobiles on one or more pre-established Internet Protocol (IP) sessions between the real-time exchange and the mobiles, one or more circuit channels are established by the real-time exchange with the mobiles through the at least one of the mobile switching centers in parallel with the first or initial talkbursts or volleys being transmitted, and one or more second or subsequent talkbursts or volleys are transmitted by the real-time exchange from the originating mobile to the terminating mobiles on the circuit channels, and wherein a Group Home real-time exchange acts as a controller of the Hybrid PTT call, each of the mobiles pre-establishes the IP sessions with its own Home real-time exchange, the Home real-time exchange establishes the IP sessions with the Group Home real-time exchange, and the Hybrid PTT call is routed through the Home real-time exchange to the Group Home real-time exchange, and a mobile that is outside the cellular telephone network pre-establishes the IP sessions with its own Home real-time exchange via a Roaming Gateway.

2. The system of claim 1, wherein the terminating mobile originates another Hybrid PTT call.

3. A method of providing advanced calling services in a cellular telephone network, comprising:

making calls between mobiles in a cellular telephone network, wherein the calls are initiated by call setup and in-band signaling within the cellular telephone network and voice frames for the calls are switched between the mobiles by one or more mobile switching centers across bearer paths in the cellular telephone network, interfacing at least one real-time exchange to at least one of the mobile switching centers in the cellular telephone network to provide advanced voice services therein, wherein the advanced voice services provide instant two-way half-duplex voice messaging within a group of users of the cellular telephone network and the instant two-way half-duplex voice messaging comprises a Hybrid Push-to-Talk (PTT) call, transmitting, by the real-time exchange, one or more first or initial talkbursts or volleys comprising voice packets from an originating mobile to one or more terminating mobiles on one or more pre-established Internet Protocol (IP) sessions between the real-time exchange and the mobiles, establishing, by the real-time exchange, one or more circuit channels with the mobiles through the at least one of the mobile switching centers in parallel with the first or initial talkbursts or volleys being transmitted, and transmitting, by the real-time exchange, second or subsequent talkbursts or volleys from the originating mobile to the terminating mobiles on the circuit channels, and wherein a Group Home real-time exchange acts as a controller of the Hybrid PTT call, each of the mobiles pre-establishes the IP sessions with its own Home real-time exchange, the Home real-time exchange establishes the IP sessions with the Group Home real-time exchange, and the Hybrid PTT call is routed through the Home real-time exchange to the Group Home real-time exchange, and a mobile that is outside the cellular telephone network pre-establishes the IP sessions with its own Home real-time exchange via a Roaming Gateway.

4. The method of claim 3, wherein the terminating mobile originates another Hybrid PTT call.

5. A system for providing advanced voice services in a cellular telephone network, comprising:

a cellular telephone network for making calls between mobiles, wherein the calls are initiated by call setup and in-band signaling within the cellular telephone network and voice frames for the calls are switched between the mobiles by one or more mobile switching centers across bearer paths in the cellular telephone network, at least one real-time exchange that interfaces to at least one of the mobile switching centers in the cellular telephone network to provide advanced voice services therein, the advanced voice services providing instant two-way half-duplex voice messaging within a group of users of the cellular telephone network, the instant two-way half-duplex voice messaging comprises a Hybrid Push-to-Talk (PTT) call, wherein a wakeup message is transmitted from an originating mobile to the real-time exchange, and the real-time exchange transmits the wakeup message to one or more terminating mobiles, on one or more pre-established Internet Protocol (IP) sessions between the real-time exchange and the mobiles, in order to place the terminating mobiles in a state to receive one or more first or initial talkbursts or volleys comprising voice packets transmitted from the originating mobile, the first or initial talkbursts or volleys are transmitted by the real-time exchange from the originating mobile to the one or more terminating mobiles on the one or more pre-established Internet Protocol (IP) sessions between the real-time exchange and the mobiles, one or more circuit channels are established by the real-time exchange with the mobiles through the at least one of the mobile switching centers in parallel with the first or initial talkbursts or volleys being transmitted, and one or more second or subsequent talkbursts or volleys are transmitted by the real-time exchange from the originating mobile to the terminating mobiles on the circuit channels, and wherein a Group Home real-time exchange acts as a controller of the Hybrid PTT call, each of the mobiles pre-establishes the IP sessions with its own Home real-time exchange, the Home real-time exchange establishes the IP sessions with the Group Home real-time exchange, and the Hybrid PTT call is routed through the Home real-time exchange to the Group Home real-time exchange, and a mobile that is outside the cellular telephone network pre-establishes the IP sessions with its own Home real-time exchange via a Roaming Gateway.

6. The system of claim 5, wherein one or more circuit channels are established by the real-time exchange with the mobiles through the at least one of the mobile switching centers in parallel with the first talkburst or volley being transmitted, and second and subsequent talkbursts or volleys are transmitted by the real-time exchange from the originating mobile to the terminating mobiles on the circuit channels.

7. The system of claim 6, wherein the wakeup message helps to speed up establishment of the circuit channels.

8. The system of claim 5, wherein the wakeup message is transmitted from the originating mobile when a user logs into a client on the originating mobile.

9. The system of claim 5, wherein the wakeup message is transmitted from the originating mobile when a user navigates a contact list.

10. The system of claim 9, wherein the wakeup message is transmitted from the originating mobile when a user selects one or more contacts or groups from the contact list.

11. The system of claim 5, wherein the wakeup message is transmitted from the originating mobile when a user navigates a call history list.

12. The system of claim 11, wherein the wakeup message is transmitted from the originating mobile when a user selects one or more entries from the call history list.

13. The system of claim 5, wherein the wakeup message is transmitted from the real-time exchange to the terminating mobiles when a participant list is sent by the originating mobile to the real-time exchange.

14. The system of claim 5, wherein the real-time exchange determines which terminating mobiles to wake up when a wakeup message is sent by the originating mobile to the real-time exchange.

15. The system of claim 5, wherein the real-time exchange determines which terminating mobiles to wake up based on previous call history information when a wakeup message is sent by the originating mobile to the real-time exchange.

16. A method of providing advanced calling services in a cellular telephone network, comprising:

making calls between mobiles in a cellular telephone network, wherein the calls are initiated by call setup and in-band signaling within the cellular telephone network and voice frames for the calls are switched between the mobiles by one or more mobile switching centers across bearer paths in the cellular telephone network, interfacing at least one real-time exchange to at least one of the mobile switching centers in the cellular telephone network to provide advanced voice services therein, wherein the advanced voice services provide instant two-way half-duplex voice messaging within a group of users of the cellular telephone network and the instant two-way half-duplex voice messaging comprises a Hybrid Push-to-Talk (PTT) call, transmitting a wakeup message from an originating mobile to the real-time exchange, wherein the real-time exchange transmits the wakeup message to one or more terminating mobiles, on one or more pre-established Internet Protocol (IP) sessions between the real-time exchange and the mobiles, in order to place the terminating mobiles in a state to receive one or more first or initial talkbursts or volleys comprising voice packets transmitted from the originating mobile, and transmitting the first or initial talkbursts or volleys by the real-time exchange from the originating mobile to the one or more terminating mobiles on the one or more pre-established Internet Protocol (IP) sessions between the real-time exchange and the mobiles, and wherein a Group Home real-time exchange acts as a controller of the Hybrid PTT call, each of the mobiles pre-establishes the IP sessions with its own Home real-time exchange, the Home real-time exchange establishes the IP sessions with the Group Home real-time exchange, and the Hybrid PTT call is routed through the Home real-time exchange to the Group Home real-time exchange, and a mobile that is outside the cellular telephone network pre-establishes the IP sessions with its own Home real-time exchange via a Roaming Gateway.

17. The method of claim 16, wherein one or more circuit channels are established by the real-time exchange with the mobiles through the at least one of the mobile switching centers in parallel with the first talkburst or volley being transmitted, and second and subsequent talkbursts or volleys are transmitted by the real-time exchange from the originating mobile to the terminating mobiles on the circuit channels.

18. The method of claim 17, wherein the wakeup message helps to speed up establishment of the circuit channels.

19. The method of claim 16, wherein the wakeup message is transmitted from the originating mobile when a user logs into a client on the originating mobile.

20. The method of claim 16, wherein the wakeup message is transmitted from the originating mobile when a user navigates a contact list.

21. The method of claim 20, wherein the wakeup message is transmitted from the originating mobile when a user selects one or more contacts or groups from the contact list.

22. The method of claim 16, wherein the wakeup message is transmitted from the originating mobile when a user navigates a call history list.

23. The method of claim 22, wherein the wakeup message is transmitted from the originating mobile when a user selects one or more entries from the call history list.

24. The method of claim 16, wherein the wakeup message is transmitted from the real-time exchange to the terminating mobiles when a participant list is sent by the originating mobile to the real-time exchange.

25. The method of claim 16, wherein the real-time exchange determines which terminating mobiles to wake up when a wakeup message is sent by the originating mobile to the real-time exchange.

26. The method of claim 16, wherein the real-time exchange determines which terminating mobiles to wake up based on previous call history information when a wakeup message is sent by the originating mobile to the real-time exchange.

* * * * *